United States Patent
Baldwin et al.

(10) Patent No.: US 9,669,600 B2
(45) Date of Patent: *Jun. 6, 2017

(54) COEXTRUDED, CROSSLINKED MULTILAYER POLYOLEFIN FOAM STRUCTURES FROM RECYCLED POLYOLEFIN FOAM MATERIAL AND METHODS OF MAKING THE SAME

(71) Applicant: TORAY PLASTICS (AMERICA), INC., N. Kingstown, RI (US)

(72) Inventors: Jesse Baldwin, Strasburg, VA (US); Kaitlyn M. Bock, Stephens City, VA (US); Pawel Sieradzki, Cross Junction, VA (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,745

(22) Filed: Dec. 30, 2014

(65) Prior Publication Data
US 2016/0185080 A1  Jun. 30, 2016

(51) Int. Cl.
*B32B 5/32* (2006.01)
*B32B 27/06* (2006.01)
(Continued)

(52) U.S. Cl.
CPC ............ *B32B 5/32* (2013.01); *B29C 47/0004* (2013.01); *B29C 47/065* (2013.01); *B29C 71/04* (2013.01);
(Continued)

(58) Field of Classification Search
CPC ........... B32B 5/32; B32B 9/025; B32B 5/245; B32B 27/065; B29C 47/0004;
(Continued)

(56) References Cited

U.S. PATENT DOCUMENTS

| 4,410,602 A | 10/1983 | Komoda et al. |
| 5,118,561 A | 6/1992 | Gusavage et al. |

(Continued)

FOREIGN PATENT DOCUMENTS

| EP | 1 066 958 | 1/2001 |
| WO | WO 2011/008845 | 1/2011 |

(Continued)

OTHER PUBLICATIONS

International Search Report and Written Opinion mailed on Mar. 25, 2015, directed to International Application No. PCT/US14/72548; 10 pages.

(Continued)

*Primary Examiner* — Stella Yi
(74) *Attorney, Agent, or Firm* — Morrison & Foerster LLP

(57) ABSTRACT

A physically crosslinked, closed cell continuous multilayer foam structure comprising at least one polypropylene/polyethylene coextruded foam layer is obtained. The multilayer foam structure is obtained by coextruding a multilayer structure comprising at least one foam composition layer, irradiating the coextruded structure with ionizing radiation, and continuously foaming the irradiated structure.

24 Claims, 10 Drawing Sheets

(51) Int. Cl.

| | |
|---|---|
| *B32B 5/24* | (2006.01) |
| *B32B 9/02* | (2006.01) |
| *C08J 11/06* | (2006.01) |
| *C08J 9/00* | (2006.01) |
| *C08J 9/10* | (2006.01) |
| *B29C 47/00* | (2006.01) |
| *B29C 71/04* | (2006.01) |
| *B29C 47/06* | (2006.01) |
| *B29L 9/00* | (2006.01) |
| *B29K 23/00* | (2006.01) |
| *B29K 105/00* | (2006.01) |
| *B29K 105/04* | (2006.01) |
| *B29K 105/24* | (2006.01) |
| *B29K 105/26* | (2006.01) |
| *B29C 35/08* | (2006.01) |

(52) U.S. Cl.
CPC .............. *B32B 5/245* (2013.01); *B32B 9/025* (2013.01); *B32B 27/065* (2013.01); *C08J 9/0061* (2013.01); *C08J 9/103* (2013.01); *C08J 11/06* (2013.01); *B29C 2035/085* (2013.01); *B29C 2035/0855* (2013.01); *B29C 2035/0872* (2013.01); *B29C 2035/0877* (2013.01); *B29K 2023/18* (2013.01); *B29K 2105/0005* (2013.01); *B29K 2105/0085* (2013.01); *B29K 2105/0088* (2013.01); *B29K 2105/046* (2013.01); *B29K 2105/24* (2013.01); *B29K 2105/26* (2013.01); *B29K 2995/0063* (2013.01); *B29L 2009/00* (2013.01); *B32B 2250/22* (2013.01); *B32B 2250/242* (2013.01); *B32B 2266/025* (2013.01); *B32B 2266/08* (2013.01); *B32B 2272/00* (2013.01); *B32B 2307/72* (2013.01); *B32B 2605/003* (2013.01); *C08J 2201/026* (2013.01); *C08J 2201/03* (2013.01); *C08J 2203/04* (2013.01); *C08J 2323/06* (2013.01); *C08J 2323/12* (2013.01); *C08J 2323/16* (2013.01); *C08J 2400/30* (2013.01); *C08J 2423/06* (2013.01); *C08J 2423/12* (2013.01); *C08J 2423/16* (2013.01)

(58) Field of Classification Search
CPC ...... B29C 47/065; B29C 71/04; C08J 9/0061; C08J 9/103; C08J 11/06
See application file for complete search history.

(56) References Cited

U.S. PATENT DOCUMENTS

| | | |
|---|---|---|
| 5,462,794 A | 10/1995 | Lindemann et al. |
| 5,552,448 A | 9/1996 | Kobayashi et al. |
| 5,594,038 A | 1/1997 | Kobayashi et al. |
| 5,605,660 A | 2/1997 | Buongiorno et al. |
| 5,646,194 A | 7/1997 | Kobayashi et al. |
| 5,738,922 A | 4/1998 | Kobayashi et al. |
| 5,928,776 A | 7/1999 | Shioya et al. |
| 6,218,023 B1 | 4/2001 | DeNicola, Jr. et al. |
| 6,251,319 B1 | 6/2001 | Tusim et al. |
| 6,537,404 B1 | 3/2003 | Ishiwatari et al. |
| 6,586,482 B2 | 7/2003 | Gehlsen et al. |
| 6,586,489 B2 | 7/2003 | Gehlsen et al. |
| 6,593,380 B2 | 7/2003 | Gehlsen et al. |
| 6,638,985 B2 | 10/2003 | Gehlsen et al. |
| 6,949,283 B2 | 9/2005 | Kollaja et al. |
| 7,083,849 B1 | 8/2006 | Albrecht et al. |
| 7,582,352 B2 | 9/2009 | Kobayashi et al. |
| 7,655,296 B2 | 2/2010 | Haas et al. |
| 7,820,282 B2 | 10/2010 | Haas et al. |
| 7,879,441 B2 | 2/2011 | Gehlsen et al. |
| 2003/0219582 A1 | 11/2003 | Ramesh et al. |
| 2004/0229968 A1 | 11/2004 | Dontula et al. |
| 2006/0276581 A1 | 12/2006 | Ratzsch et al. |
| 2007/0287003 A1 | 12/2007 | Matsumura et al. |
| 2010/0215879 A1* | 8/2010 | Dooley ............... B29C 47/0023 428/35.7 |
| 2010/0286357 A1 | 11/2010 | Matsumura et al. |
| 2011/0244206 A1 | 10/2011 | Penache et al. |
| 2012/0295086 A1 | 11/2012 | Baldwin et al. |
| 2014/0061967 A1 | 3/2014 | Stanhope et al. |
| 2014/0070442 A1 | 3/2014 | Morita et al. |
| 2014/0170344 A1 | 6/2014 | Pramanik et al. |
| 2015/0184400 A1 | 7/2015 | Baldwin et al. |

FOREIGN PATENT DOCUMENTS

| | | |
|---|---|---|
| WO | WO 2013/057737 | 4/2013 |
| WO | WO 2014/049792 | 4/2014 |

OTHER PUBLICATIONS

Baldwin et al., U.S. Appl. No. 14/144,986, filed Dec. 31, 2013; 37 pages.

Baldwin et al., U.S. Office Action mailed May 2, 2016, directed to U.S. Appl. No. 14/144,345; 18 pages.

International Search Report and Written Opinion mailed on May 20, 2016, directed to International Application No. PCT/US2015/67875; 14 pages.

Baldwin et al., U.S. Office Action mailed Aug. 25, 2016, directed to U.S. Appl. No. 14/144,986; 6 pages.

Baldwin et al., U.S. Office Action mailed Oct. 6, 2016, directed to U.S. Appl. No. 14/586,721; 7 pages.

Baldwin et al., U.S. Office Action mailed Jan. 25, 2017, directed to U.S. Appl. No. 14/144,345; 15 pages.

\* cited by examiner

COEXTRUDED, CROSSLINKED MULTILAYER POLYOLEFIN FOAM STRUCTURES FROM RECYCLED POLYOLEFIN FOAM MATERIAL AND METHODS OF MAKING THE SAME

FIELD OF THE INVENTION

This invention relates to multilayer polyolefin foam structures. More particularly, to coextruded, crosslinked polyolefin multilayer foam structures.

BACKGROUND OF THE INVENTION

Over the past three decades, manufacturing businesses have been successful in recycling many types of wastes: newspapers, cardboard, aluminum, steel, glass, various plastics, films, foams, etc. In the case of plastics, there are certain types of plastic waste that do not readily recycle into commercially viable new products. One such type of waste is metallized polyolefin material.

Metallized polyolefins are common in the food packaging industry as barrier films. For example, metalized polyolefin films are used as potato chip bags, snack bar wrappers, etc. Other applications of metalized polyolefin films, particularly polypropylene films, include the packaging of electronic and medical devices as well as dielectrics in electronic film capacitors.

Another application of metallized polyolefins, particularly polypropylene, is in the plating industry. Decorative chrome plating (trivalent chromium) of injection molded polypropylene is commonly found on household and domestic appliances as well as on components of other durable and non-durable goods. In addition, also common is decorative vacuum metalizing of polypropylene and polyethylene molded parts and thermoformed sheets including, for example, confectionary trays.

Metal plating of polypropylene moldings is also not limited to decorative applications. Engineering requirements such as EMI and RFI shielding, electro-static dissipation, wear resistance, heat resistance, and thermal and chemical barriers at times necessitates the metal plating of polypropylene moldings.

Currently, there are various methods and systems for reclaiming and recycling various films and foams, including films and foams containing metallized polyolefins. In addition, as manufacturers are continuously trying to employ "greener" techniques in the manufacturing process, commercial uses for these recycled materials are increasing in demand. However, various problems arise whenever recycled material is used in the manufacturing process.

SUMMARY OF THE INVENTION

Applicants have discovered that using recycled material to create foam structures can cause unwanted surface variations on the foam. These unwanted surface variations can include unwanted surface roughness, unwanted surface softness, unwanted surface firmness, unwanted surface energy, and unwanted surface adhesive compatibility among others. In certain commercial applications, such as in the automotive interior trim industry, the surface properties of the foam are critical. When used for automotive interior trim, laminators will normally laminate a film, fabric, fiber layer, or leather to the foam. The foam laminate then typically can be thermoformed onto a hard polypropylene, ABS, or wood fiber composite substrate. In order for the foam laminate formation and/or the foam laminate thermoformed formation to be successful, the foam surfaces should be consistent. Surface variations on the foam surfaces can negatively affect lamination strength and quality.

An example of undesirable surface characteristics is illustrated in FIGS. 5A and 5B. The foams in FIGS. 5A and 5B contain 8% parts per hundred parts resin ("PPHR") shredded (but not cryogenically pulverized) factory scrap crosslinked polypropylene/polyethylene blended foam. As shown in FIGS. 5A-5B, dark spots and "gels" can be seen as black colored recycled foam that has not been fully broken down, dispersed, and otherwise reincorporated into these foam sheets. These spots and "gels" can cause problems for a laminator attaching a film, fabric, fiber layer, or leather to these foams. Specifically, adhesion at the "gel" may be poorer and may delaminate during a secondary operation such as thermoforming, causing a visible blister-like defect on the film, fabric, fiber layer, or leather.

Applicants have discovered coextruded multilayer foam structures including a surface foam layer(s) derived from virgin (non-recycled) polyolefin material and an interior foam layer(s) derived from one or more recycled polyolefin materials. In addition, these foam structures can include the recycled foam layer(s) sandwiched or buried between two non-recycled foam layers. Accordingly, these multilayer foam structures can allow manufacturers to continue to use recycled material to create lower cost and more environmentally friendly products that can perform to the same standards as a foam structures made entirely from non-recycled material.

Described are multilayer foam structures and methods of making and using these structures. More particularly, described are formulations of a physically crosslinked, coextruded continuous multilayer foam structures with a closed cell morphology. These formulations can utilize recycled polyolefin material and incorporate it into a layer. As recited herein, a "structure" includes, but is not limited to, layers, films, webs, sheets, or other similar structures.

Some embodiments include methods of forming multilayer structures by coextruding a foam layer and a film layer on a side of the foam layer. The foam layer can include polypropylene and/or polyethylene and a chemical foaming agent. The foam layer can also include a crosslinking agent and the chemical foaming agent can be azodicarbonamide. The film layer can include polypropylene and/or polyethylene. The polypropylene in either layer can have a melt flow index of 0.1-25 grams per 10 minutes at 230° C. The polyethylene in either layer can have a melt flow index of 0.1-25 grams per 10 minutes at 190° C.

In some embodiments, theses coextruded structures can be irradiated with ionizing radiation. The coextruded structures may be irradiated up to 4 separate times. The ionizing radiation may be alpha rays, beta rays, gamma rays, or electron beams. Furthermore, the ionizing radiation may be an electron beam with an acceleration voltage of 200-1500 kV. The dosage of the electron beam may be 10-500 kGy. The ionizing radiation can crosslink the coextruded structures to a crosslinking degree of 20-75%.

In some embodiments, the irradiated, coextruded structures may also be foamed. The foaming process can be continuous to form foam structures. The foaming may include heating the irradiated structures with molten salt, radiant heaters, vertical hot air oven, horizontal hot air oven, microwave energy, or a combination thereof.

The multilayer foamed structures can have a density of 20-250 kg/m$^3$ and a thickness of 0.2-50 mm. In addition, the foam layer can have an average closed cell size of 0.05-1.0 mm and a mean surface roughness of less than 80 μm.

Some embodiments include methods of forming multilayer structures by coextruding a first foam layer and a second foam layer on a side of the first foam layer. The first foam layer can include polypropylene and/or polyethylene and a first chemical foaming agent. The second foam layer can include polypropylene and/or polyethylene and a second chemical foaming agent. The polypropylene in either layer can have a melt flow index of 0.1-25 grams per 10 minutes at 230° C. The polyethylene in either layer can have a melt flow index of 0.1-25 grams per 10 minutes at 190° C. The first and/or second foam layers can also include a crosslinking agent. Furthermore, the first and/or second chemical foaming agent can be azodicarbonamide.

In some embodiments, theses coextruded structures can be irradiated with ionizing radiation. The coextruded structures may be irradiated up to 4 separate times. The ionizing radiation may be alpha rays, beta rays, gamma rays, or electron beams. Furthermore, the ionizing radiation may be an electron beam with an acceleration voltage of 200-1500 kV. The dosage of the electron beam may be 10-500 kGy. The ionizing radiation can crosslink the coextruded structures to a crosslinking degree of 20-75%.

In some embodiments, the irradiated, coextruded structures may also be foamed. The foaming process can be continuous to form foam structures. The foaming may include heating the irradiated structures with molten salt, radiant heaters, vertical hot air oven, horizontal hot air oven, microwave energy, or a combination thereof.

The multilayer foamed structures can have a density of 20-250 kg/m$^3$ and a thickness of 0.2-50 mm. In addition, the multilayer foam structure can have an average closed cell size of 0.05-1.0 mm. Furthermore, the first foam layer and/or the second foam layer can have a mean surface roughness of less than 80 μm.

Some embodiments include methods of forming multilayer structures by coextruding a first layer and a second layer on a side of the first layer. The first layer can include polypropylene and/or polyethylene and a first chemical foaming agent. The second layer can include 5-75 wt. % recycled metallized polyolefin material; 25-95 wt. % polypropylene, polyethylene, or a combination of polypropylene and polyethylene; and a second chemical foaming agent. Furthermore, a third layer can be coextruded on a side of the second layer opposite the first layer. The third layer can comprise polypropylene and/or polyethylene and a third chemical foaming agent. In addition, the first and/or third layer can be substantially free of recycled polyolefin material. Furthermore, any or all of the first, second, or third layers can include a crosslinking agent. In addition, any or all of the first, second, or third chemical foaming agents can be azodicarbonamide. The polypropylene in any layer can have a melt flow index of 0.1-25 grams per 10 minutes at 230° C. The polyethylene in any layer can have a melt flow index of 0.1-25 grams per 10 minutes at 190° C.

The recycled metallized polyolefin material can be small enough to pass through a standard sieve of 0.375 inches. Furthermore, the recycled metallized polyolefin material may have had a metal layer(s) with an overall thickness of 0.003-100 μm, prior to being recycled.

In some embodiments, theses coextruded structures can be irradiated with ionizing radiation. The coextruded structures may be irradiated up to 4 separate times. The ionizing radiation may be alpha rays, beta rays, gamma rays, or electron beams. Furthermore, the ionizing radiation may be an electron beam with an acceleration voltage of 200-1500 kV. The dosage of the electron beam may be 10-500 kGy. The ionizing radiation can crosslink the coextruded structures to a crosslinking degree of 20-75%.

In some embodiments, the irradiated, coextruded structures may also be foamed. The foaming process can be continuous to form foam structures. The foaming may include heating the irradiated structures with molten salt, radiant heaters, vertical hot air oven, horizontal hot air oven, microwave energy, or a combination thereof.

The multilayer foamed structures can have a density of 20-250 kg/m$^3$ and can have a thickness of 0.2-50 mm. In addition, the multilayer foam structure can have an average closed cell size of 0.05-1.0 mm. Furthermore, the first foam layer and/or the third foam layer can have a mean surface roughness of less than 80 μm.

Some embodiments include a multilayer foam structure that has a coextruded first foam layer including polypropylene and/or polyethylene and a coextruded second foam layer on a side of the first foam layer. The second foam layer can include 5-75 wt. % recycled metallized polyolefin material and 25-95 wt. % polypropylene, polyethylene, or a combination of polypropylene and polyethylene. The multilayer foam structure can also include a coextruded third foam layer on a side of the second foam layer opposite the first foam layer. The third layer can include polypropylene and/or polyethylene. The first foam layer and/or the third foam layer can be substantially free of recycled polyolefin material. The polypropylene in any layer can have a melt flow index of 0.1-25 grams per 10 minutes at 230° C. The polyethylene in any layer can have a melt flow index of 0.1-25 grams per 10 minutes at 190° C.

The multilayer foamed structures can have a density of 20-250 kg/m$^3$ and can have a thickness of 0.2-50 mm. In addition, the multilayer foam structure can have an average closed cell size of 0.05-1.0 mm. The multilayer foam structure can also have a crosslinking degree of 20-75%. Furthermore, the first foam layer and/or the third foam layer can have a mean surface roughness of less than 80 μm. In addition, in some embodiments the multilayer foam structure may be slit, friction sawed, sheared, heat cut, laser cut, plasma cut, water jet cut, die-cut, mechanically cut, or manually cut to form an article.

Some embodiments include a laminate that includes a multilayer foam structure and a laminate layer. The multilayer foam structure can include a coextruded first foam layer that includes polypropylene and/or polyethylene and a second coextruded foam layer on a side of the first foam layer. The second foam layer can include 5-75 wt. % recycled metallized polyolefin material and 25-95 wt. % polypropylene, polyethylene, or a combination of polypropylene and polyethylene. The laminate layer can be on a side of the first foam layer opposite the second foam layer. The laminate layer can be a film, fabric, fiber layer, or a leather. The first foam layer can have a mean surface roughness less than 80 μm. The multilayer foam structure can also include a coextruded third foam layer on a side of the second foam layer opposite the first foam layer. The third layer can include polypropylene and/or polyethylene. The first and/or third layers can be substantially free of recycled polyolefin material. In addition, the laminate can further be thermoformed onto a substrate such that the substrate is on a side of the third foam layer opposite the second foam layer.

Some embodiments include methods of forming multilayer structures by coextruding a first layer and a second layer on a side of the first layer. The first layer can include polypropylene and/or polyethylene and a first chemical foaming agent. The second layer can include 5-50 wt. % recycled, crosslinked polyolefin foam material; 50-95 wt. % polypropylene, polyethylene, or a combination of polypropylene and polyethylene; and a second chemical foaming agent. Furthermore, a third layer can be coextruded on a side of the second layer opposite the first layer. The third layer can comprise polypropylene and/or polyethylene and a third chemical foaming agent. In addition, the first and/or third layer can be substantially free of recycled polyolefin material. Furthermore, any or all of the first, second, or third layers can include a crosslinking agent. In addition, any or all of the first, second, or third chemical foaming agents can be azodicarbonamide. The polypropylene in any layer can have a melt flow index of 0.1-25 grams per 10 minutes at 230° C. The polyethylene in any layer can have a melt flow index of 0.1-25 grams per 10 minutes at 190° C.

The recycled, crosslinked polyolefin foam material can be cryogenically pulverized polyolefin foam material. The cryogenically pulverized polyolefin foam material can be small enough to pass through a 3.5 U.S. Standard mesh In some embodiments, theses coextruded structures can be irradiated with ionizing radiation. The coextruded structures may be irradiated up to 4 separate times. The ionizing radiation may be alpha rays, beta rays, gamma rays, or electron beams. Furthermore, the ionizing radiation may be an electron beam with an acceleration voltage of 200-1500 kV. The dosage of the electron beam may be 10-500 kGy. The ionizing radiation can crosslink the coextruded structures to a crosslinking degree of 20-75%.

In some embodiments, the irradiated, coextruded structures may also be foamed. The foaming process can be continuous to form foam structures. The foaming may include heating the irradiated structures with molten salt, radiant heaters, vertical hot air oven, horizontal hot air oven, microwave energy, or a combination thereof.

The multilayer foamed structures can have a density of 20-250 kg/m³ and can have a thickness of 0.2-50 mm. In addition, the multilayer foam structure can have an average closed cell size of 0.05-1.0 mm. Furthermore, the first foam layer and/or the third foam layer can have a mean surface roughness of less than 80 μm.

Some embodiments include a multilayer foam structure that has a coextruded first foam layer including polypropylene and/or polyethylene and a coextruded second foam layer on a side of the first foam layer. The second foam layer can include 5-50 wt. % recycled, crosslinked polyolefin foam material and 50-95 wt. % polypropylene, polyethylene, or a combination of polypropylene and polyethylene. The multilayer foam structure can also include a coextruded third foam layer on a side of the second foam layer opposite the first foam layer. The third layer can include polypropylene and/or polyethylene. The first foam layer and/or the third foam layer can be substantially free of recycled polyolefin material. The polypropylene in any layer can have a melt flow index of 0.1-25 grams per 10 minutes at 230° C. The polyethylene in any layer can have a melt flow index of 0.1-25 grams per 10 minutes at 190° C. The recycled, crosslinked polyolefin foam material can include cryogenically pulverized polyolefin foam material.

The multilayer foamed structures can have a density of 20-250 kg/m³ and can have a thickness of 0.2-50 mm. In addition, the multilayer foam structure can have an average closed cell size of 0.05-1.0 mm. The multilayer foam structure can also have a crosslinking degree of 20-75%. Furthermore, the first foam layer and/or the third foam layer can have a mean surface roughness of less than 80 μm. In addition, in some embodiments the multilayer foam structure may be slit, friction sawed, sheared, heat cut, laser cut, plasma cut, water jet cut, die-cut, mechanically cut, or manually cut to form an article.

Some embodiments include a laminate that includes a multilayer foam structure and a laminate layer. The multilayer foam structure can include a coextruded first foam layer that includes polypropylene and/or polyethylene and a second coextruded foam layer on a side of the first foam layer. The second foam layer can include 5-50 wt. % recycled, crosslinked polyolefin foam material and 50-95 wt. % polypropylene, polyethylene, or a combination of polypropylene and polyethylene. The laminate layer can be on a side of the first foam layer opposite the second foam layer. The laminate layer can be a film, fabric, fiber layer, or a leather. The first foam layer can have a mean surface roughness less than 80 μm. The recycled, crosslinked polyolefin foam material can include cryogenically pulverized polyolefin foam material. The multilayer foam structure can also include a coextruded third foam layer on a side of the second foam layer opposite the first foam layer. The third layer can include polypropylene and/or polyethylene. The first and/or third layers can be substantially free of recycled polyolefin material. In addition, the laminate can further be thermoformed onto a substrate such that the substrate is on a side of the third foam layer opposite the second foam layer.

It is understood that aspects and embodiments of the invention described herein include "consisting" and/or "consisting essentially of" aspects and embodiments. For all methods, systems, compositions, and devices described herein, the methods, systems, compositions, and devices can either comprise the listed components or steps, or can "consist of" or "consist essentially of" the listed components or steps. When a system, composition, or device is described as "consisting essentially of" the listed components, the system, composition, or device contains the components listed, and may contain other components which do not substantially affect the performance of the system, composition, or device, but either do not contain any other components which substantially affect the performance of the system, composition, or device other than those components expressly listed; or do not contain a sufficient concentration or amount of the extra components to substantially affect the performance of the system, composition, or device. When a method is described as "consisting essentially of" the listed steps, the method contains the steps listed, and may contain other steps that do not substantially affect the outcome of the method, but the method does not contain any other steps which substantially affect the outcome of the method other than those steps expressly listed.

In the disclosure, "substantially free of" a specific component, a specific composition, a specific compound, or a specific ingredient in various embodiments, is meant that less than about 5%, less than about 2%, less than about 1%, less than about 0.5%, less than about 0.1%, less than about 0.05%, less than about 0.025%, or less than about 0.01% of the specific component, the specific composition, the specific compound, or the specific ingredient is present by weight. Preferably, "substantially free of" a specific component, a specific composition, a specific compound, or a specific ingredient indicates that less than about 1% of the specific component, the specific composition, the specific compound, or the specific ingredient is present by weight.

Additional advantages of this invention will become readily apparent to those skilled in the art from the following detailed description. As will be realized, this invention is capable of other and different embodiments, and its details are capable of modifications in various obvious respects, all without departing from this invention. Accordingly, the examples and description are to be regarded as illustrative in nature and not as restrictive.

BRIEF DESCRIPTION OF THE DRAWINGS

Exemplary embodiments of the invention will now be described with reference to the accompanying figures, in which.

DETAILED DESCRIPTION OF THE INVENTION

Figure 1A:
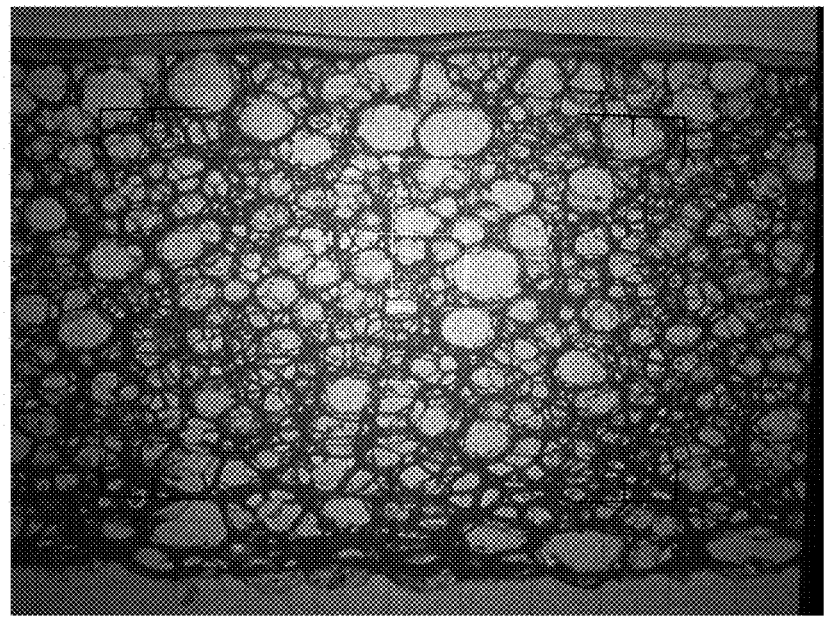
FIG. 1A is a backlit magnified photograph of the foam of Example 1.

Described are methods of producing crosslinked, closed cell coextruded multilayer foam structures. A layer or layers of the multilayer foam structure can be derived from recycled polyolefin material. The methods for producing a crosslinked, closed cell co-extruded multilayer foam structure including a recycled polyolefin foam layer may include the steps of (a) co-extrusion, (b) irradiation, and (c) foaming.

Co-extrusion is the extrusion of multiple layers of material simultaneously. This type of extrusion utilizes two or more extruders to deliver a steady volumetric throughput of material to an extrusion head (die) which can extrude the materials in the desired form.

In the co-extrusion step, foam compositions can be fed into multiple extruders to form an unfoamed, multilayer structure. For example, an "A" foam composition can be fed into one extruder and a "B" foam composition can be fed into a second extruder. The method of feeding ingredients into the extruders can be based on the design of the extruder and the material handling equipment available. Preblending ingredients of the foam compositions may be performed, if necessary, to facilitate their dispersal. A Henshel mixer can be used for such preblending. All ingredients can be preblended and fed thru a single port in the extruder. The ingredients can also be individually fed thru separate designated ports for each ingredient. For example, if the crosslinking promoter or any other additive is a liquid, the promoter and/or additives can be added through a feeding gate (or gates) on the extruder or through a vent opening on the extruder (if equipped with a vent) instead of being preblended with solid ingredients. Combinations of "preblending" and individual ingredient port feeding can also be employed.

Each extruder can deliver a steady amount of each composition into one or more manifolds followed by a sheeting die to create an unfoamed co-extruded multilayer sheet. There are two common methods for co-extruding materials: (1) feed block manifolds; and (2) multi-manifolds within the die. Elements of a feed block manifold can include: (a) inlet ports for the upper, middle, and lower layers; (b) a streamlined melt lamination area that channels separate flow streams into one laminated melt stream inside the feed block; (c) an adapter plate between the feed block and the sheet die; and/or (d) a sheet die (similar to monolayer die), wherein the laminated melt stream enters the center of the die and spreads out along the manifold flowing out of the die exit as a distinct multilayer extrudate. Elements of a multi-manifold die can be: (a) similar to a monolayer die, except that there is more than one feed channel; (b) that each melt channel has its own choker bar for flow control; and/or (c) that the melt streams converge inside the die near the exit and emerge as a distinct multilayer extrudate.

Layer thicknesses can be determined by the design of the manifold(s) and die. For example, an 80/20 feed block manifold can deliver compositions in approximately a 4:1 ratio when the speed and size of each extruder is matched accordingly. This ratio can be altered by changing, for example: (a) the relative extrusion speed between one extruder and another; (b) the relative size of each extruder; and/or (c) the composition (i.e., the viscosity) of the individual layers.

The thickness of the overall multilayer sheet can be controlled by the overall die gap. However, the overall multilayer sheet thickness can further be adjusted, for example, by stretching (i.e., "drawing") the melted multilayer extrudate and/or flattening the melted multilayer extrudate through a nip.

The multilayer structures can include at least 2 layers made up of different compositions. In some embodiments, the multilayer structures include at least 2 layers made up of different foam compositions. In some embodiments, the multilayer structure includes at least one non-recycled polyolefin layer and at least one recycled polyolefin layer. For example, the structure can be an A/B layered structure, A/B/A layered structure, A/B/C layered structure, or can have multiple other layers. In some structures, the B layer can include recycled polyolefin material and the A layer can include non-recycled polyolefin material. However, both the A, B, and other layers can be made up of non-recycled polyolefin material or recycled polyolefin material as well. Furthermore, the multilayer structures can include additional layers such as tie layers, film layers, and/or additional foam layers (including additional recycled and/or non-recycled layers) among others.

The foam composition fed into the extruder to form the non-recycled layer(s) can include at least one polypropylene, at least one polyethylene, or a combination thereof. These polypropylene(s) and/or polyethylene(s) include the same types described below with regard to the recycled metallized polyolefin material. That is, the polypropylene includes, but is not limited to, polypropylene, impact modified polypropylene, polypropylene-ethylene copolymer, impact modified polypropylene-ethylene copolymer, metallocene polypropylene, metallocene polypropylene-ethylene copolymer, metallocene polypropylene olefin block copolymer (with a controlled block sequence), polypropylene based polyolefin plastomer, polypropylene based polyolefin elasto-plastomer, polypropylene based polyolefin elastomer, polypropylene based thermoplastic polyolefin blend and polypropylene based thermoplastic elastomeric blend. Furthermore, the polypropylenes may be grafted with maleic anhydride. In addition, the polyethylene includes, but is not limited to, LDPE, LLDPE, VLDPE, VLLDPE, HDPE, polyethylene-propylene copolymer, metallocene polyethylene, metallocene ethylene-propylene copolymer, and metallocene polyethylene olefin block copolymer (with a controlled block sequence), any of which may contain grafted compatibilizers or copolymers that contain acetate and/or ester groups. These polyethylenes may be grafted with maleic anhydride. These polyethylenes may also be copolymers and terpolymers containing acetate and/or ester groups and may be copolymer and terpolymer ionomers containing acetate and/or ester groups. The foam composition fed into the extruder to form the non-recycled layer(s) can include at least about 75 wt. % non-recycled polypropylene, polyethylene, or a combination thereof, preferably at least about 90 wt. %, more preferably at least about 95 wt. %, and even more preferably at least about 98 wt. %. In addition, the foam compositions fed into the extruder to form the non-recycled layer(s) can be substantially free of recycled polyolefin material. The foam compositions fed into the extruder to form the non-recycled layer(s) can also be 100 wt. % virgin or non-recycled material.

Since a broad range of multilayer foam articles and laminates can be created with the disclosed foam compositions, a broad range of polypropylenes and polyethylenes can be employed in the foam compositions to meet the various end use requirements of the structures, articles, and laminates.

The foam compositions fed into the extruders to form the recycled layer(s) can include recycled material including, but not limited to, recycled polyolefin material, recycled metallized polyolefin material, recycled polyolefin film material, recycled polyolefin metallized film material, recycled polyolefin foam material, recycled polyolefin metallized foam material, or combinations thereof. The foam composition fed into the extruder to form the recycled layer(s) can include at least about 5 wt. % recycled material, preferably at least about 10 wt. %, and more preferably at least about 15 wt. %. In addition, these foam compositions fed into the extruders to form the recycled layer(s) can include at least about 25 wt. %, preferably at least about 30 wt. %, and more preferably at least about 40 wt. % polypropylene, polyethylene, or combinations thereof.

When the foam compositions fed into the extruder to form the recycled layer(s) includes recycled metallized polyolefin material, the foam composition can include about 5 to about 75 wt. % recycled metallized polyolefin material, preferably from about 10 to about 70 wt. %, and more preferably from about 20 to about 60 wt. %. In addition, these recycled metallized polyolefin foam compositions can include about 25 to about 95 wt. %, preferably about 30 to about 90 wt. %, and more preferably about 40 to about 80 wt. % polypropylene, polyethylene, or combinations thereof.

Recycled metallized polyolefin material is available in various forms. Examples include, but are not limited to: pellets, granules, chips, flakes, beads, cylinders, rods, fluff, and powder. In some embodiments, recycled metallized polyolefin material can be obtained as homogenous pellets utilizing the process disclosed in WO 2013057737 A2, which is hereby incorporated by reference in its entirety. In some embodiments, chips or flakes of recycled metallized polyolefin material can be obtained from plastic chippers and shredders commonly used to reduce the size of waste profiles, injection molded pieces, etc. In a third example, pulverized metallized polyolefin material can be obtained from commercial pulverizing equipment or cryogenic pulverization.

Regardless of the form, it can be preferred that the recycled material pieces be reduced in size to pass thru a standard sieve of about 0.375 inches (9.5 mm). Recycled pieces that do not pass thru a standard sieve of about 0.375 inches (9.5 mm) can be difficult to sufficiently shear and mix with other ingredients within the extruder. Thus, a homogenous structure may not be obtained.

The primary sources of metallized polyolefins are the metalizing and metal coating industries. These industries employ various techniques to obtain metallized polyolefins, including vacuum metallization, arc or flame spraying, electroless plating, or electroless plating followed by electroplating. The coatings are often not limited to one metallic layer. Polyolefin coated with multiple layers of varying metals deposited using different techniques can also be used in the disclosed invention.

Metallized polyolefins can be obtained by vacuum metallization, arc or flame spraying, electroless plating, or electroless plating followed by electroplating. Each technique to obtain metallized polyolefins is briefly described as follows:

In vacuum metallization, a metal is evaporated in a vacuum chamber. The vapor then condenses onto the surface of the substrate, leaving a thin layer of metal coating. This deposition process is also commonly called physical vapor deposition (PVD).

In flame spraying, a hand-held device is used to spray a layer of metallic coating on the substrate. The primary force behind deposition is a combustion flame, driven by oxygen and gas. Metallic powder is heated and melted. The combustion flame accelerates the mixture and releases it as a spray.

Arc spraying is similar to flame spraying, but the power source is different. Instead of depending on a combustion flame, arc spraying derives its energy from an electric arc. Two wires, composed of the metallic coating material and carrying DC electric current, touch together at their tips. The energy that releases, when the two wires touch, heats and melts the wire, while a stream of gas deposits the molten metal onto the surface of the substrate, creating a metal layer.

In electroless plating, the surface of the plastic is etched away using an oxidizing solution. The surface becomes extremely susceptible to hydrogen bonding as a result of the oxidizing solution and typically increases during the coating application. Coating occurs when the polyolefin component (post-etching) is immersed in a solution containing metal ions, which then bond to the plastic surface as a metal layer.

In order for electroplating (electrolytic plating) to be successful, the polyolefin surface must first be rendered conductive, which can be achieved through electroless plating. Once the polyolefin surface is conductive, the substrate is immersed in a solution. In the solution are metallic salts, connected to a positive source of current (cathode). An anodic (negatively charged) conductor is also placed in the bath, which creates an electrical circuit in conjunction with the positively charged salts. The metallic salts are electrically attracted to the substrate, where they create a metal layer. As this process happens, the anodic conductor, typically made of the same type of metal as the metallic salts, dissolves into the solution and replaces the source of metallic salts, which is depleted during deposition.

The amount of coating that can be deposited by each technique varies. Depending on the end use requirements, one technique may be preferable over another. Nonetheless, the metal coatings deposited by these techniques will range from about 0.003 µm for a single layer to 100 µm for a multi-layer coating, preferably from 0.006 µm for a single layer to 75 µm for a multi-layer coating, and more preferably from 0.01 to µm for a single layer to 50 µm for a multi-layer coating. The metal in the recycled metallized polyolefins varies from about 0.05 to about 5 wt. %.

The most common metal coating applied to polyolefins is aluminum. Less common coatings are trivalent chromium, nickel, and copper. Even less common coatings are, but not limited to, tin, hexavalent chromium, gold, silver, as well as co-deposited metals such as nickel-chromium. Those skilled in the art will appreciate that these metal coatings are not necessarily pure elemental coatings. For example, "nickel" may be nickel-phosphorus or nickel-boron alloy and "copper" may be copper-zinc alloy (brass) or copper-tin alloy (bronze). Regardless of whether the metal is or isn't alloyed, the specific metal is still the primary component of the coating. It can be preferred that the metallic coating contain 70-100% of the named metal, more preferably 80-100% of the named metal, and even more preferably 85-100% of the named metal. Those skilled in the art will also appreciate that the surface of the metal layers can be oxidized, and some of the metals, tarnished.

Both polypropylene and polyethylene films can be vacuum metalized in the film metallizing industry. It should thus be expected that any recycled metallized polyolefin can contain at least one polypropylene, or at least one polyethylene, or a mixture of both. For barrier applications (rather than decorative applications), both polypropylene and polyethylene films may be coextruded with other barrier layer materials, such as EVOH and PVOH. In such instances, these multilayer films can have adhesive "tie layers" to bond the EVOH and PVOH to the polypropylene or polyethylene. These tie layers range in polyolefins from OBC to polyethylene with acetate or ester groups to polyethylene ionomers.

Likewise, polypropylenes and polyethylenes grafted with maleic anhydride are also used in the industry to improve adhesion, not only with adjoining EVOH or PVOH but also with the metal coatings.

In the metal coatings industry, polypropylene may often be preferred over polyethylene. However, due to the broader end use requirements for articles produced in this industry, polypropylenes may be blended with other olefins to meet, for example, softness requirements, impact requirements, or adhesion requirements, etc. Thus, it should be expected that any recycled metallized polyolefin from this industry may be a blended polyolefin.

The polypropylene(s) comprising the polyolefin component of the recycled polyolefin may contain an elastic or softening component, typically an ethylene, α-olefin, or rubber component. Thus, the term "polypropylene" in this disclosure includes, but is not limited to, polypropylene, impact modified polypropylene, polypropylene-ethylene copolymer, impact modified polypropylene-ethylene copolymer, metallocene polypropylene, metallocene polypropylene-ethylene copolymer, metallocene polypropylene olefin block copolymer (with a controlled block sequence), polypropylene based polyolefin plastomer, polypropylene based polyolefin elasto-plastomer, polypropylene based polyolefin elastomer, polypropylene based thermoplastic polyolefin blend and polypropylene based thermoplastic elastomeric blend.

A non-limiting example of "polypropylene" is an isotactic homopolypropylene. Commercially available examples include, but are not limited to, FF018F from Braskem, 3271 from Total Petrochemicals, and COPYLENE™ CH020 from Conoco.

A non-limiting example of an "impact modified polypropylene" is a homopolypropylene with ethylene-propylene (EP) copolymer rubber. The rubber can be amorphous or semicrystalline but is not in sufficient quantities to render the material any plastomeric or elastomeric properties. A few non-limiting examples of commercially available "impact modified polypropylene" are TI4015F and TI4015F2 from Braskem and Pro-fax® 8623 and Pro-fax® SB786 from LyondellBasell.

"Polypropylene-ethylene copolymer" is polypropylene with random ethylene units. A few non-limiting examples of commercially available "polypropylene-ethylene copolymer" are 6232, 7250FL, and Z9421 from Total Petrochemicals and TR3020F from Braskem.

"Impact modified polypropylene-ethylene copolymer" is polypropylene with random ethylene units and with ethylene-propylene (EP) copolymer rubber. The rubber can be amorphous or semicrystalline, but is not in sufficient quantities to render the material any plastomeric or elastoplastomeric properties. A non-limiting example of a commercially available impact modified polypropylene-ethylene copolymer is PRISMA™ 6910 from Braskem.

"Metallocene polypropylene" is metallocene syndiotactic homopolypropylene, metallocene atactic homopolypropylene, and metallocene isotactic homopolypropylene. Non-limiting examples of "metallocene polypropylene" are those commercially available under the trade names METOCENE™ from LyondellBasell and ACHIEVE™ from ExxonMobil. Metallocene polypropylenes are also commercially available from Total Petrochemicals and include, but are not limited to, grades M3551, M3282MZ, M7672, 1251, 1471, 1571, and 1751.

"Metallocene polypropylene-ethylene copolymer" is metallocene syndiotactic, metallocene atactic, and metallocene isotactic polypropylene with random ethylene units. Commercially available examples include, but are not limited to, Lumicene® MR10MX0 and Lumicene® MR60MC2 from Total Petrochemicals and Purell® SM170G from LyondellBasell.

"Metallocene polypropylene olefin block copolymer" is a polypropylene with alternating crystallizable hard "blocks" and amorphous soft "blocks" that are not randomly distributed—that is, with a controlled block sequence. An example of "metallocene polypropylene olefin block copolymer" includes, but is not limited to, the INTUNE™ product line from the Dow Chemical Company.

"Polypropylene based polyolefin plastomer" (POP) and "polypropylene based polyolefin elastoplastomer" are both metallocene and non-metallocene propylene based copolymers with plastomeric and elastoplastomeric properties. Non-limiting examples are those commercially available under the trade name VERSIFY™ (metallocene) from the Dow Chemical Company, VISTAMAXX™ (metallocene) from ExxonMobil, and KOATTRO™ (non-metallocene) from LyondellBasell (a butene-1 based line of plastomeric polymers—certain grades are butene-1 homopolymer based and others are polypropylene-butene-1 copolymer based materials).

"Polypropylene based polyolefin elastomer" (POE) is both metallocene and non-metallocene propylene based copolymer with elastomeric properties. Non-limiting examples of propylene based polyolefin elastomers are those polymers commercially available under the trade names THERMORUN™ and ZELAS™ (non-metallocene) from Mitsubishi Chemical Corporation, ADFLEX™ and SOFTELL™ (both non-metallocene) from LyondellBasell, VERSIFY™ (metallocene) from the Dow Chemical Company, and VISTAMAXX™ (metallocene) from ExxonMobil.

"Polypropylene based thermoplastic polyolefin blend" (TPO) is polypropylene, polypropylene-ethylene copolymer, metallocene homopolypropylene, and metallocene polypropylene-ethylene copolymer, which have ethylene-propylene copolymer rubber in amounts great enough to give the thermoplastic polyolefin blend (TPO) plastomeric, elastoplastomeric or elastomeric properties. Non-limiting examples of polypropylene based polyolefin blend polymers are those polymer blends commercially available under the trade names EXCELINK™ from JSR Corporation, THERMORUN™ and ZELAS™ from Mitsubishi Chemical Corporation, FERROFLEX™ and RxLOY™ from Ferro Corporation, and TELCAR™ from Teknor Apex Company.

"Polypropylene based thermoplastic elastomer blend" (TPE) is polypropylene, polypropylene-ethylene copolymer, metallocene homopolypropylene, and metallocene polypropylene-ethylene copolymer, which have diblock or multiblock thermoplastic rubber modifiers (SEBS, SEPS, SEEPS, SEP, SERC, CEBC, HSB and the like) in amounts great enough to give the thermoplastic elastomer blend (TPE) plastomeric, elastoplastomeric, or elastomeric properties. Non-limiting examples of polypropylene based thermoplastic elastomer blend polymers are those polymer blends commercially available under the trade name DYNAFLEX® and VERSAFLEX® from GLS Corporation, MONPRENE® and TEKRON® from Teknor Apex Company and DURAGRIP® from Advanced Polymers Alloys (a division of Ferro Corporation).

All of the above polypropylenes may be grafted with maleic anhydride. Non-limiting examples are ADMER® QF500A and ADMER® QF551A from Mitsui Chemicals. It should be noted that most commercial anhydride-grafted polypropylenes also contain rubber.

The term "polyethylene" includes, but is not limited to, LDPE, LLDPE, VLDPE, VLLDPE, HDPE, polyethylene-propylene copolymer, metallocene polyethylene, metallocene ethylene-propylene copolymer, and metallocene polyethylene olefin block copolymer (with a controlled block sequence).

"Metallocene polyethylene" is metallocene based polyethylene with properties ranging from non-elastic to elastomeric. Non-limiting examples of metallocene polyethylene are commercially available under the trade name ENGAGE™ from Dow Chemical Company, ENABLE™ and EXCEED™ from ExxonMobil, and EXACT™ from Borealis.

"VLDPE" and "VLLDPE" are very low density polyethylene and very linear density low density polyethylene containing an elastic or softening component, typically α-olefins. Non-limiting examples of VLDPE and VLLDPE are commercially available under the tradename FLEXOMER™ from the Dow Chemical Company and particular grades of STAMYLEX™ from Borealis.

"Metallocene polyethylene olefin block copolymer" is a polyethylene with alternating crystallizable hard "blocks" and amorphous soft "blocks" that are not randomly distributed—that is, with a controlled block sequence. An example of "metallocene polyethylene olefin block copolymer" includes, but is not limited to, the INFUSE™ product line from the Dow Chemical Company.

All of the above polyethylenes may be grafted with maleic anhydride. Non-limiting commercially available examples are ADMER® NF539A from Mitsui Chemicals, BYNEL® 4104 from DuPont, and OREVAC® 18360 from Arkema. It should be noted that most commercial anhydride-grafted polyethylenes also contain rubber.

These polyethylenes may also be copolymers and terpolymers containing acetate and/or ester groups. The comonomer groups include, but are not limited to, vinyl acetate, methyl acrylate, ethyl acrylate, butyl acrylate, glycidyl methacrylate, and acrylic acid. Non-limiting examples are commercially available under the tradename BYNEL®, ELVAX® and ELVALOY® from DuPont; EVATANE®, LOTADER®, and LOTRYL® from Arkema; ESCORENE™, ESCOR™, and OPTEMA™ from Exxon-Mobil.

These polyethylenes may also be copolymer and terpolymer ionomers containing acetate and/or ester groups. A common comonomer group is, but is not limited to, methacrylic acid. Non-limiting examples are commercially available under the tradename SURLYN® from DuPont; IOTEK™ from ExxonMobil, and AMPLIFY™ 10 from Dow Chemical Company.

The polymer component of the recycled polyolefin may also contain EVOH and/or PVOH ("PVA"). "EVOH" is a copolymer of ethylene and vinyl alcohol. Non-limiting examples are commercially available under the tradename EVAL™ and EXCEVAL™ from Kuraray and SOARNOL™ from Nippon Gohsei. "PVOH" is a polyvinyl alcohol. Non-limiting examples are commercially available under the tradename ELVANOL® from DuPont and POVAL®, MOWIOL®, and MOWIFLEX® from Kuraray.

The recycled polyolefin foam material used to form the recycled layer(s) includes, but is not limited to, cryogenically pulverized factory scrap, crosslinked foam including polypropylene foams, polyethylene foams, or polypropylene/polyethylene blended foams. When the foam composition fed into the extruder to form the recycled layer(s) includes recycled polyolefin foam material, the foam compositions can include about 5 to about 50 wt. % recycled polyolefin foam material, preferably from about 10 to about 45 wt. %, and more preferably from about 15 to about 40 wt. %. In addition, these recycled polyolefin foam material foam compositions can include about 50 to about 95 wt. %, preferably about 55 to about 90 wt. %, and more preferably about 60 to about 85 wt. % polypropylene, polyethylene, or combinations thereof.

Cryogenic pulverizing (also known as cryogenic grinding) is a method that can be employed to effectively and efficiently reduce heat sensitive, oxidizable, and/or "tough-to-mill" materials into a fine powder. A crosslinked, polyolefin foam is an example of one such material that is not well suited for ambient milling systems. In the cryogenic pulverizing process, a cryogenic liquid such as nitrogen or carbon dioxide can be used to cool the material prior to and/or during milling to help prevent its melting and/or achieve embrittlement. Cryogenically pulverized factory scrap crosslinked foams (including polypropylene foams, polyethylene foams, and polypropylene/polyethylene blended foams) are commercially available from commercial cryogenic pulverizers in various particle sizes and distributions.

Grinding mills typically contain a sieve near the discharge chute to ensure that the material being pulverized can be reduced to at least a maximum desired particle size. The milling sieve can be at least a 3.5 U.S. Standard mesh, preferably at least a 6 U.S. Standard mesh, and more preferably at least a 30 U.S. Standard mesh. It can be preferred that the recycled foam material pieces be reduced in size to pass thru at least a 3.5 U.S. Standard mesh (5.6 mm opening), preferably at least a 6 U.S. Standard mesh (3.35 mm opening), and more preferably at least a 30 U.S. Standard mesh (0.600 mm opening).

A non-limiting example of finely pulverized recycled factory scrap crosslinked polypropylene, polyethylene, and polypropylene/polyethylene blended foam is that produced from Midwest Elastomers, Inc. (Wapakoneta, Ohio). Such recycled foam from Midwest Elastomers can be pulverized with a 30 U.S. Standard mesh sieve installed near the discharge chute.

The recycled polyolefin foam material can also include foam material that already included recycled polyolefin material. As such, the recycled polyolefin foam material can be re-recycled polyolefin material. For example, the recycled polyolefin foam material may already contain recycled contents of metallized polyolefin material and/or cryogenically pulverized factor scrap crosslinked foams. In addition, the recycled polyolefin foam material can include foams derived from recycled metallized polyolefin material as disclosed in U.S. application Ser. No. 14/144,986, which is hereby incorporated by reference in its entirety.

The foam compositions fed into the extruders to form the various foam layers can include at least one polypropylene having a melt flow index from about 0.1 to about 25 grams per 10 minutes at 230° C. and/or at least one polyethylene having a melt flow index from about 0.1 to about 25 grams per 10 minutes at 190° C. In some embodiments, the melt flow index of the polypropylene(s) and/or polyethylene(s) can preferably be from about 0.3 to about 20 grams per 10 minutes at 230° C. and at 190° C., respectively, and more preferably from about 0.5 to about 15 grams per 10 minutes at 230° C. and at 190° C., respectively.

The "melt flow index" (MFI) value for a polymer can be defined and measured according to ASTM D1238 at 230° C. for polypropylenes and polypropylene based materials and at 190° C. for polyethylenes and polyethylene based materials using a 2.16 kg plunger for 10 minutes. The test time may be reduced for relatively high melt flow resins.

The MFI provides a measure of flow characteristics of a polymer and is an indication of the molecular weight and processability of a polymer material. If the MFI values are too high, which corresponds to a low viscosity, extrusion according to the present disclosure may not be satisfactorily carried out. Problems associated with MFI values that are too high include low pressures during extrusion, problems setting the thickness profile, uneven cooling profile due to low melt viscosity, poor melt strength, machine problems, or a combination thereof. Problems with MFI values that are too low include high pressures during melt processing, sheet quality and profile problems, and higher extrusion temperatures which cause a risk of foaming agent decomposition and activation.

The above MFI ranges are also important for foaming processes because they reflect the viscosity of the material and the viscosity has an effect on the foaming. Without being bound by any theory, it is believed there are several reasons why particular MFI values are more effective than others. A lower MFI material may improve some physical properties as the molecular chain length is greater, creating more energy needed for chains to flow when a stress is applied. Also, the longer the molecular chain (MW), the more crystal entities the chain can crystallize thus providing more strength through intermolecular ties. However, at too low an MFI, the viscosity becomes too high. On the other hand, polymers with higher MFI values have shorter chains. Therefore, in a given volume of a material with higher MFI values, there are more chain ends on a microscopic level relative to polymers having a lower MFI, which can rotate and create free volume due to the space needed for such rotation (e.g., rotation occurring above the $T_g$, or glass transition temperature of the polymer). This increases the free volume and enables an easy flow under stress forces.

These polypropylene(s) and/or polyethylene(s) with specific MFI values which can be used in forming any of the layers of the foam multilayer structure include the same types described earlier. That is, the polypropylene includes, but is not limited to, polypropylene, impact modified polypropylene, polypropylene-ethylene copolymer, impact modified polypropylene-ethylene copolymer, metallocene polypropylene, metallocene polypropylene-ethylene copolymer, metallocene polypropylene olefin block copolymer (with a controlled block sequence), polypropylene based polyolefin plastomer, polypropylene based polyolefin elastoplastomer, polypropylene based polyolefin elastomer, polypropylene based thermoplastic polyolefin blend and polypropylene based thermoplastic elastomeric blend. Furthermore, the polypropylenes may be grafted with maleic anhydride. In addition, the polyethylene includes, but is not limited to, LDPE, LLDPE, VLDPE, VLLDPE, HDPE, polyethylene-propylene copolymer, metallocene polyethylene, metallocene ethylene-propylene copolymer, and metallocene polyethylene olefin block copolymer (with a controlled block sequence), any of which may contain grafted compatibilizers or copolymers that contain acetate and/or ester groups. As discussed previously, these polyethylenes may be grafted with maleic anhydride. These polyethylenes may also be copolymers and terpolymers containing acetate and/or ester groups and may be copolymer and terpolymer ionomers containing acetate and/or ester groups.

When relatively large or thick pieces of metal (in relation to the foam cell size) are present in the recycled layer of the multilayer foam structure, undesirable "voids" and "large cells" may occur. Thus, including polypropylene and/or polyethylene with grafted compatibilizers or copolymers that contain acetate and/or ester groups as ingredients may be required to prevent the formation of these undesirable "voids" and "large cells".

In addition, the foam compositions fed into the extruder may also contain further additives compatible with producing the disclosed multilayer foam structures. Common additives include, but are not limited to, organic peroxides, antioxidants, extrusion processing aids, other lubricants, thermal stabilizers, colorants, flame retardants, antistatic agents, nucleating agents, plasticizers, antimicrobials, antifungals, light stabilizers, UV absorbents, anti-blocking agents, fillers, deodorizers, thickeners, cell size stabilizers, metal deactivators, and combinations thereof.

Regardless of how all the ingredients are fed into the extruders, the shearing force and mixing within an extruder processing recycled polyolefin material should be sufficient to produce a homogenous layer (in as much as the recycled polyolefin material being fed into the extruder is homogenous). A co-rotating twin screw extruder can provide sufficient shearing force and mixing thru the extruder barrel to extrude a layer with uniform properties.

Specific energy is an indicator of how much work is being applied during the extrusion of the ingredients and how intensive the extrusion process is. Specific energy can be defined as the energy applied to a material being processed by the extruder, normalized to a per kilogram basis. The specific energy can be quantified in units of kilowatts of applied energy per total material fed in kilograms per hour. Specific energy can be calculated according to the formula:

$$\text{Specific Energy} = \frac{\text{KW(applied)}}{\text{feedrate}\left(\frac{\text{kg}}{\text{hr}}\right)}, \text{ where}$$

$$\text{KW(applied)} = \frac{\text{KW(motor rating)} * (\% \text{ torque from maximum allowable}) * RPM(\text{actual running } RPM)}{\text{Max } RPM(\text{capability of extruder}) * 0.97 \text{ (gearbox efficiency)}}$$

Specific energy can be used to quantify the amount of shearing and mixing of the ingredients within an extruder. The extruders used for the present invention can be capable of producing a specific energy of at least 0.090 kW·hr/kg, preferably at least 0.105 kW·hr/kg, and more preferably at least 0.120 kW·hr/kg.

The extrusion temperature for each layer of the multilayer structures can be at least 10° C. below the thermal decomposition initiation temperature of the chemical foaming (i.e., "blowing") agent. If the extrusion temperature exceeds the thermal decomposition temperature of the foaming agent, then the foaming agent will decompose, resulting in undesirable "prefoaming."

The foam compositions can include a variety of different chemical foaming agents. Examples of chemical foaming agents include, but are not limited to, azo compounds, hydrazine compounds, carbazides, tetrazoles, nitroso compounds, and carbonates. In addition, a chemical foaming agent may be employed alone or in any combination. Generally, the amount of the chemical foaming agent can be about the same in the various layers. For example, if one layer has significantly more PPHR of a chemical foaming agent than another layer (assuming the same chemical foaming agent), then the layer that is foaming less could hinder the expansion of the layer that is foaming more. Thus, problems with the multilayer structure curling, buckling, and/or folding onto itself may occur as the multilayer structure is heated and foamed.

One chemical foaming agent that can be used in some embodiments is azodicarbonamide ("ADCA"). The amount of ADCA in a foam layer composition can be less than or equal to about 40% PPHR. ADCA's thermal decomposition typically occurs at temperatures between about 190 to 230° C. In order to prevent ADCA from thermally decomposing in the extruder, extruding temperature can be maintained at or below 190° C. Another chemical foaming agent that can be used in some embodiments is p-toluenesulfonyl hydrazide ("TSH"). The amount of TSH in a foam layer composition can be less than or equal to 77% PPHR. Another chemical foaming agent that can be used in some embodiments is p-toluenesulfonyl semicarbazide ("TSS"). The amount of TSS in a foam layer composition can be less than or equal to 63% PPHR. The amount of chemical foaming agent can depend on the unfoamed sheet thickness, the desired foam thickness, desired foam density, materials being extruded, crosslinking percentage, type of chemical foaming agent (different foaming agents can significantly generate different quantities of gas), among others. However, the amount of foaming agent in each layer should be chosen in order for the foaming of each layer to be relatively equal.

If the difference between the decomposition temperature of the thermally decomposable foaming agent and the melting point of the polymer with the highest melting point is high, then a catalyst for foaming agent decomposition may be used. Exemplary catalysts include, but are not limited to, zinc oxide, magnesium oxide, calcium stearate, glycerin, and urea.

The lower temperature limit for extrusion can be that of the polymer with the highest melting point. If the extrusion temperature drops below the melting temperature of the polymer with the highest melting point, then undesirable "unmelts" can appear in the structure. Upon foaming, the extruded layer that was extruded below this lower temperature limit can exhibit uneven thickness, a non-uniform cell structure, pockets of cell collapse, and other undesirable attributes.

Extruding an unfoamed multilayer sheet (as described in the present application) is different than extruding a foamed multilayer sheet, commonly referred to as "extrusion foaming." Extrusion foaming can be performed with a physical foaming agent, a chemical foaming agent, or a combination thereof. Examples of physical foaming agents are inorganic and organic gases (e.g., nitrogen, carbon dioxide, pentane, butane, etc.) that can be injected under high pressure directly into the polymer melt. These gases can nucleate and expand as the polyolefin melt exits the extrusion die to create the foamed polymer. Examples of chemical foaming agents (e.g., those previously described in the disclosure) are solids that can decompose exothermally or endothermally upon a decomposition temperature to produce gases. Typical gases generated from chemical foaming agents include nitrogen, carbon dioxide, carbon monoxide, and ammonia among others. In order to extrusion foam using a chemical foaming agent, the chemical foaming agent can be dispersed in the polyolefin melt and the melt can be heated to above the decomposition temperature of the chemical foaming agent while still in the extruder and die. As such, the foamed polymer can be made as the polyolefin melt exits the extrusion die.

Regardless of whether the foaming agent is a physical foaming agent, chemical foaming agent, or a combination thereof, typical extrusion foaming generates polyolefin foam structures with surfaces that are significantly rougher than equivalent foam structures produced by the disclosed method of first coextruding an unfoamed, multilayer sheet, wherein the foaming occurs post-extrusion. Rougher surfaces of extrusion foamed structures are generally caused by larger sized cells when compared to foams produced by the disclosed methods of first coextruding an unfoamed multilayer sheet. Although the cell size and size distribution of a foam structure may not be critical in some commercial applications, since surface roughness is a function of cell size, foams with larger cells may be less desirable than foam structures with smaller cells for applications requiring a smooth foam surface.

As stated above, the surface profile for foam structures is critical in many applications and therefore extrusion foamed structures may not be desirable for these applications. Instead, these applications require a smooth foam structure surface to obtain desired properties such as ease of lamination to a film, fabric, fiber layer, and/or leather; percentage contact in the lamination; and visual aesthetics among others. A comparison between the surface roughness of an extrusion foamed sheet and a non-extrusion foamed sheet produced by the methods described herein can be found in the Examples section below. The mean surface roughness for the foams produced by the methods described herein can be less than about 80 µm, less than about 70 µm, less than about 50 µm, less than about 40 µm, less than about 30 µm, less than about 25 µm, less than about 20 µm, less than about 15 µm, and less than about 10 µm. The maximum height (height between the highest peak and the deepest valley) of the surface of the foams produced by the methods described herein can be less than about 700 µm, less than about 600 µm, less than about 300 µm, less than about 250 µm, less than about 200 µm, less than about 150 µm, and less than 100 µm.

The thickness of an unfoamed, co-extruded multilayer structure can be about 0.1 to about 30 mm, preferably from about 0.2 to about 25 mm, more preferably from about 0.3 to about 20 mm, and even more preferably from about 0.4 to about 15 mm. In addition, the thickness of any individual layer including the recycled layer(s) and non-recycled layer(s) in the unfoamed, co-extruded multilayer structure can be at least about 0.05 mm, preferably at least about 0.1 mm, more preferably at least about 0.15 mm, and even more preferably at least about 0.2 mm.

In embodiments where a layer(s) of the multilayer structure is not intended to be foamed (e.g., wherein a layer is a "skin" or "film" layer), the non-foaming layer(s) can be thin and easily pliable when melted so as to not significantly hinder the expansion of the foam layer(s) during the foaming process. The physical properties of the non-foaming layer(s) that can hinder the expansion of the foam layer(s) include, but are not limited to, the non-foaming layer's thickness, flexibility, melt strength, and crosslinking percentage. Similarly, the thickness, flexibility, melt strength, and crosslinking percentage of the foam layer(s) as well as the ultimate thickness and density of the foam layer(s) can also affect whether the non-foaming layer(s) inhibits the expansion of the foam layer(s).

In general, the non-foaming layer(s)'s thickness can preferably be no more than about 20% of the overall coextruded unfoamed structure's thickness. When the non-foaming layer(s)'s thickness is greater than about 20% of the overall thickness of the coextruded, unfoamed structure, problems with the multilayer structure curling, buckling, and/or folding onto itself may occur as the multilayer structure is heated and foamed. In contrast, the non-foaming layer(s)'s thickness is not limited to how thin it can be in relation to the overall unfoamed, coextruded multilayer structure. For example, the non-foaming layer(s) can be as thin as about 0.1 µm (i.e., the typical thickness of a thin tie layer used in multilayer flexible packaging and barrier films).

After the co-extruded multilayer structure has been produced by the extruders, the coextruded structure can be subjected to irradiation with ionizing radiation at a given exposure to crosslink the composition of the coextruded structure, thereby obtaining an irradiated, crosslinked, multilayer structure. Ionizing radiation can often be unable to produce a sufficient degree of crosslinking on polypropylene(s), polypropylene based materials, some polyethylene(s), and some polyethylene based materials. Thus, a crosslinking promoter can typically be added to the foam compositions that are fed into the extruders to promote crosslinking. Polymers crosslinked by ionizing radiation are commonly referred to as "physically crosslinked."

Physical crosslinking differs from chemical crosslinking. In chemical crosslinking, the crosslinks can be generated with crosslinking promoters, but without the use of ionizing radiation. Chemical crosslinking can typically include using either peroxides, silanes, or vinylsilanes. During peroxide crosslinking processes, the crosslinking typically occurs in the extrusion die. In contrast, for silane and vinylsilane crosslinking processes, the crosslinking typically occurs post extrusion during a secondary operation where the crosslinking of the extruded material can be accelerated with heat and moisture.

Regardless of the chemical crosslinking process, chemically crosslinked foam structures typically exhibit surfaces that are significantly rougher than equivalent foam structures produced by the disclosed method of physical crosslinking. Rougher surfaces of chemically crosslinked foam structures are generally caused by larger sized cells when compared to foams produced by the disclosed methods of using physical crosslinking. Although the cell size and size distribution of a foam structure may not be critical in some commercial applications, since surface roughness is a function of cell size, foams with larger cells may be less desirable than foam structures with smaller cells for applications requiring a smooth foam surface.

As stated above, the surface profile for foam structures is critical in many applications and therefore chemically crosslinked structures are not desirable for these applications. Instead, these applications require a smooth foam structure surface to obtain desired properties such as ease of lamination to a film, fabric, fiber layer, and/or leather; percentage contact in the lamination; and visual aesthetics among others. A comparison between the surface roughness of a chemically crosslinked sheet and a physically crosslinked sheet produced by the methods described herein can be found in the Examples section below.

Examples of ionizing radiation include, but are not limited to, alpha rays, beta rays, gamma rays, and electron beams. Among them, an electron beam having uniform energy can preferably be used to prepare the crosslinked, multilayer structures. Exposure time, frequency of irradiation, and acceleration voltage upon irradiation with an electron beam can vary widely depending on the intended crosslinking degree and the thickness of the coextruded, multilayer structure. However, the ionizing radiation should generally be in the range of from about 10 to about 500 kGy, preferably from about 20 to about 300 kGy, and more preferably from about 20 to about 200 kGy. If the exposure is too low, then cell stability may not be maintained upon foaming. If the exposure is too high, the moldability of the resulting multilayer foam structure may be poor. (Moldability can be a desirable property when the multilayer foam structure is used in thermoforming applications.) Also, the unfoamed multilayer structure may be softened by exothermic heat release upon exposure to the electron beam radiation such that the structure can deform when the exposure is too high. In addition, the polymer components may also be degraded from excessive polymer chain scission.

The coextruded, unfoamed multilayer structure may be irradiated up to 4 separate times, preferably no more than twice, and more preferably only once. If the irradiation frequency is more than about 4 times, the polymer components may suffer degradation so that upon foaming, for example, uniform cells will not be created in the resulting foam layers.

When the thickness of the coextruded multilayer structure is greater than about 4 mm, irradiating each primary surface of the multilayer profile with an ionized radiation can be preferred to make the degree of crosslinking of the primary surface(s) and the inner layer(s) more uniform.

Irradiation with an electron beam provides an advantage in that coextruded structures having various thicknesses can be effectively crosslinked by controlling the acceleration voltage of the electrons. The acceleration voltage can generally be in the range of from about 200 to about 1500 kV, preferably from about 400 to about 1200 kV, and more preferably about 600 to about 1000 kV. If the acceleration voltage is less than about 200 kV, then the radiation may not reach the inner portion of the coextruded structure. As a result, the cells in the inner portion can be coarse and uneven on foaming. Additionally, acceleration voltage that is too low for a given thickness profile may cause arcing, resulting in "pinholes" or "tunnels" in the foamed multilayer structure. On the other hand, if the acceleration voltage is greater than about 1500 kV, then the polymers may degrade.

Regardless of the type of ionizing radiation selected, crosslinking can be performed so that the composition of the coextruded structure can be crosslinked about 20 to about 75%, preferably about 30 to about 60%, as measured by the "Toray Gel Fraction Percentage Method."

According to the "Toray Gel Fraction Percentage Method," tetralin solvent is used to dissolve non-crosslinked components in a composition. In principle, the non-crosslinked material is dissolved in tetralin and the crosslinking degree is expressed as the weight percentage of crosslinked material in the entire composition.

The apparatus used to determine the percent of polymer crosslinking includes: 100 mesh (0.0045 inch wire diameter); Type 304 stainless steel bags; numbered wires and clips; a Miyamoto thermostatic oil bath apparatus; an analytical balance; a fume hood; a gas burner; a high temperature oven; an anti-static gun; and three 3.5 liter wide mouth stainless steel containers with lids. Reagents and materials used include tetralin high molecular weight solvent, acetone, and silicone oil. Specifically, an empty wire mesh bag is weighed and the weight recorded. For each sample, about 100 milligrams±about 5 milligrams of sample is weighed out and transferred to the wire mesh bag. The weight of the wire mesh bag and the sample, typically in the form of foam cuttings, is recorded. Each bag is attached to the corresponding number wire and clips. When the solvent temperature reaches 130° C., the bundle (bag and sample) is immersed in the solvent. The samples are shaken up and down about 5 or 6 times to loosen any air bubbles and fully wet the samples. The samples are attached to an agitator and agitated for three (3) hours so that the solvent can dissolve the foam. The samples are then cooled in a fume hood. The samples are washed by shaking up and down about 7 or 8 times in a container of primary acetone. The samples are washed a second time in a second acetone wash. The washed samples are washed once more in a third container of fresh acetone as above. The samples are then hung in a fume hood to evaporate the acetone for about 1 to about 5 minutes. The samples are then dried in a drying oven for about 1 hour at 120° C. The samples are cooled for a minimum of about 15 minutes. The wire mesh bag is weighed on an analytical balance and the weight is recorded.

Crosslinking can then be calculated using the formula $100*(C-A)/(B-A)$, where A=empty wire mesh bag weight; B=wire bag weight+foam sample before immersion in tetralin; and C=wire bag weight+dissolved sample after immersion in tetralin.

Suitable crosslinking agents include, but are not limited to, commercially available difunctional, trifunctional, tetrafunctional, pentafunctional, and higher functionality monomers. Such crosslinking monomers are available in liquid, solid, pellet, and powder forms. Examples include, but are not limited to, acrylates or methacrylates such as 1,6-hexanediol diacrylate, 1,6-hexanediol dimethacrylate, ethylene glycol diacrylate, ethylene glycol dimethacrylate, trimethylol propane trimethacrylate, tetramethylol methane triacrylate, 1,9-nonanediol dimethacrylate and 1,10-decanediol dimethacrylate; allyl esters of carboxylic acid (such as trimellitic acid triallyl ester, pyromellitic acid triallyl ester, and oxalic acid diallyl ester); allyl esters of cyanulic acid or isocyanulic acid such as triallyl cyanurate and triallyl isocyanurate; maleimide compounds such as N-phenyl maleimide and N,N'-m-phenylene bismaleimide; compounds having at least two tribonds such as phthalic acid dipropagyl and maleic acid dipropagyl; and divinylbenzene. Additionally, such crosslinking agents may be used alone or in any combination. The amount of crosslinking agent used in a layer's composition can vary based on the molecular weight, functionality, and crosslinking efficiency of the crosslinking agent and the ionizing radiation dosage, among others. Divinylbenzene (DVB), a difunctional liquid crosslinking monomer, can be used as a crosslinking agent in the present invention and added to an extruder at a level no greater than about 4% PPHR, and preferably about 2% to about 3.5% PPHR. Some polymers more readily crosslink more than others. Thus, layers containing polymers more apt to crosslink may have less crosslinking agent, than layers with polymers less apt to crosslink. In some embodiments, a layer can be purposefully more crosslinked than another layer, which can require adding more crosslinking agent into that layer to facilitate more crosslinking.

Crosslinks may be generated using a variety of different techniques and can be formed both intermolecularly, between different polymer molecules, and intramolecularly, between portions of a single polymer molecule. Such techniques include, but are not limited to, providing crosslinking agents which are separate from a polymer chain and providing polymer chains which incorporate a crosslinking agent containing a functional group which can form a crosslink or be activated to form a crosslink.

After irradiating the extruded structure, foaming may be accomplished by heating the crosslinked multilayer structure to a temperature higher than the decomposition temperature of the thermally decomposable foaming agent. For the thermally decomposable foaming agent azodicarbonamide, the foaming can be performed at about 200 to about 260° C., preferably about 220 to about 240° C., in a continuous process. A continuous foaming process can be preferred over a batch process for production of a continuous foam sheet.

The foaming can typically be conducted by heating the crosslinked multilayer structure with molten salt, radiant heaters, vertical hot air oven, horizontal hot air oven, microwave energy, or a combination of these methods. The foaming may also be conducted in an impregnation process using, for example, nitrogen in an autoclave, followed by a free foaming via molten salt, radiant heaters, vertical hot air oven, horizontal hot air oven, microwave energy, or a combination of these methods. A preferred combination of molten salt and radiant heaters can be used to heat the crosslinked multilayer structure. Specifically, the side of the irradiated, extruded structure that is not in contact with the molten salt can be heated via radiant heaters.

Optionally, before foaming, the crosslinked structure can be softened with preheating. This can help stabilize the expansion of the structure upon foaming.

The density of the multilayer foam structure can be defined and measured using section or "overall" density, rather than a "core" density, as measured by JIS K6767. The multilayer foam structure produced using the above described method can yield foams with a section, or "overall" density of about 20 to about 250 kg/m$^3$, preferably about 30 kg/m$^3$ to about 125 kg/m$^3$. The section density can be controlled by the amount of foaming agent and the thickness of the coextruded structure. If the density of the structure is less than about 20 kg/m$^3$, then the structure may not foam efficiently due to a large amount of chemical foaming agent needed to attain the density. Additionally, if the density of the structure is less than about 20 kg/m$^3$, then the expansion of the structure during the foaming step may become increasingly difficult to control. Furthermore, if the density of the multilayer foam structure is less than 20 kg/m$^3$, then the foam structure may become increasingly prone to cell collapse. Thus, it can be difficult to produce a multilayer foam structure of uniform section density and thickness (with or without recycled material) at a density less than about 20 kg/m$^3$.

The multilayer foam structure is not limited to a section density of about 250 kg/m$^3$. A foam of about at least 350 kg/m$^3$, about at least 450 kg/m$^3$, or about at least 550 kg/m$^3$ may also be produced. However, it can be preferred that the multilayer foam structure have a density of less than about 250 kg/m$^3$ since greater densities may generally be cost prohibitive when compared to other materials which can be used in a given application.

The various foamed layers (with or without recycled polyolefin material) in the multilayer foam structures can have similar densities. These densities can be determined and adjusted by the amount of the chemical foaming agent(s), type(s) of the chemical foaming agent, thickness of each of the coextruded unfoamed layer(s), and/or the overall thickness of the coextruded unfoamed multilayer structure. When the individual foamed layers have significantly different densities from each other, problems with the multilayer foam structure curling, buckling, and folding onto itself may occur as the multilayer structure is heated and foamed. The densities of the foamed layers can have densities within about 15% of each other, preferably within about 10% of each other, and more preferably within about 5% of each other.

The multilayer foam structures produced using the above method may have closed cells. Preferably, at least 90% of the cells have undamaged cell walls, preferably at least 95%, and more preferably more than 98%. The average cell size can be from about 0.05 to about 1.0 mm, and preferably from about 0.1 to about 0.7 mm. If the average cell size is lower than about 0.05 mm, then the density of the multilayer foam structure can typically be greater than 250 kg/m$^3$. If the average cell size is larger than 1 mm, the foam may have an uneven surface. There is also a possibility of the foam structure being undesirably torn if the population of cells in the foam does not have the preferred average cell size. This can occur when the foam structure is stretched or portions of it are subjected to a secondary process. The cell size in the multilayer foam structure may have a bimodal distribution representing a population of cells in the core of the foam structure which are relatively round and a population of cells in the skin near the surfaces of the foam structure which are relatively flat, thin, and/or oblong.

The thickness of the multilayer foam structure can be about 0.2 mm to about 50 mm, preferably from about 0.4 mm to about 40 mm, more preferably from about 0.6 mm to about 30 mm, and even more preferably from about 0.8 mm to about 20 mm. If the thickness is less than about 0.2 mm, then foaming may not be efficient due to significant gas loss from the primary surfaces. If the thickness is greater than about 50 mm, expansion during the foaming step may become increasingly difficult to control. Thus, it can be increasingly more difficult to produce a multilayer foam structure (with or without recycled polyolefin material) with uniform section density and thickness.

The desired thickness can also be obtained by a secondary process such as slicing, skiving, or bonding. Slicing, skiving, or bonding can produce a thickness range of about 0.1 mm to about 100 mm.

In embodiments where a layer(s) of the multilayer structure is not intended to be foamed, the thickness of the non-foaming layer(s) may be reduced upon foaming the multilayer structure. This can be from the foaming layer(s) expanding and consequently stretching the non-foaming layer(s). Thus, for example, if the multilayer structure expands to twice its original area, the non-foaming layer(s) thickness can be expected to be about halved. Furthermore, if the multilayer structure expands to four times its original area, the non-foaming layer(s) can be expected to be reduced to about one-quarter of its original thickness.

The disclosed multilayer foam structures can be used in a variety of applications. One such application is foam tapes and gasketing. Closed cell foam tape is commonly used in areas such as window glazing, where strips of foam tape are placed between two window panes to seal the air between the glass. This improves the thermal insulation property of the window. The foam also acts as a cushion for the glass panes from the effects of thermal expansion and contraction of the building and window frame from daily and seasonal temperature changes. Likewise, closed cell foam gaskets are commonly used for sealing and cushioning. Handheld electronic devices and household appliances are two examples that may contain foam gaskets. A soft, flexible foam structure is usually suited as a tape or gasket.

When the multilayer foam structure is to be used as a tape or gasket, a pressure sensitive adhesive layer may be disposed on at least a portion of one or both major surfaces. Any pressure sensitive adhesive known in the art may be used. Examples of such pressure sensitive adhesives include, but are not limited to, acrylic polymers, polyurethanes, thermoplastic elastomers, block copolymers, polyolefins, silicones, rubber based adhesives, copolymers of ethylhexylacrylate and acrylic acid, copolymers of isooctyl acrylate and acrylic acid, blends of acrylic adhesives and rubber based adhesives as well as combinations of the foregoing.

The multilayer foam structures can also be thermoformed. To thermoform the multilayer foam structure, the foam can be heated to the melting point of the polyolefin blend for all the layers in the multilayer foam structure. If any layer has immiscible polymers, the multilayer foam structure may exhibit more than one melting point. In this case, the multilayer foam structure can typically be thermoformed when the foam is heated to a temperature midway between the multilayer foam composition's lowest melting point and highest melting point. In addition, the multilayer foam structure can be thermoformed onto a substrate such as a hard polypropylene, ABS, or wood fiber composite. Preferably, the multilayer foam structure can be thermoformed onto the substrate such that a side of a non-recycled foam layer of the multilayer foam is applied to the substrate. The substrate itself can also be thermoformed at the same time as the multilayer foam structure. In addition, the substrate can be applied to a side (i.e., surface) of a non-recycled foam layer of the multilayer foam.

One example of a thermoformed article is an automobile air duct. A closed cell foam structure can be particularly suited for this application due to its lower weight (when compared to solid plastic), its insulating properties that help maintain the temperature of the air flowing thru the duct, and its resistance to vibration (versus solid plastic). Thus, a firm multilayer foam structure can be suitable for an automobile air duct.

In some embodiments, the multilayer foam structures are laminates containing the multilayer foam and a laminate layer. Preferably, the laminate layer can be applied to a side (i.e., surface) of a non-recycled foam layer of the multilayer foam. In these laminates, the multilayer foam structure can, for example, be combined with a film and/or foil. Examples of suitable materials for such layers include, but are not limited to, polyvinyl chloride (PVC); thermoplastic polyolefin (TPO); thermoplastic urethane (TPU); fabrics such as polyester, polypropylene, cloth and other fabrics; leather and/or fiber layers such as non-wovens. Such layers may be manufactured using standard techniques that are well known to those of ordinary skill in the art. Importantly, the multilayer foam of the disclosure may be laminated on one or both sides with these materials and may include multiple other layers. If the multilayer foam is laminated on both sides, preferably these laminate layers can be applied to sides of non-recycled foam layers of the multilayer foam.

In these laminates, a layer may be joined to an adjacent layer by means of chemical bonds, mechanical means, or combinations thereof. Adjacent laminate layers may also be affixed to each other by any other means including the use of attractive forces between materials having opposite electromagnetic charges or attractive forces present between materials which both have either a predominantly hydrophobic character or a predominantly hydrophilic character.

In some embodiments, the multilayer foam structures or laminates are used in automobile interior parts such as door panels, door rolls, door inserts, door stuffers, trunk stuffers, armrests, center consoles, seat cushions, seat backs, headrests, seat back panels, instrument panels, knee bolsters, or a headliner. These multilayer foam structures or laminates can also be used in furniture (e.g., commercial, office, and residential furniture) such as chair cushions, chair backs, sofa cushions, sofa trims, recliner cushions, recliner trims, couch cushions, couch trim, sleeper cushions, or sleeper trims. These multilayer foam laminates or structures can also be used in walls such as modular walls, moveable walls, wall panels, modular panels, office system panels, room dividers, or portable partitions. The multilayer foam laminates or structures can also be used in storage casing (e.g., commercial, office and residential) which can be either mobile or stationary. Furthermore, the multilayer foam laminates and structures can also be used in coverings such as chair cushion coverings, chair back coverings, armrest coverings, sofa coverings, sofa cushion coverings, recliner cushion coverings, recliner coverings, couch cushion coverings, couch coverings, sleeper cushion coverings, sleeper coverings, wall coverings, and architectural coverings.

Some embodiments include a first layer of the disclosed multilayer foam structure and a second layer selected from the group consisting of a solid hardwood floor panel, an engineered wood floor panel, a laminate floor panel, a vinyl floor tile, a ceramic floor tile, a porcelain floor tile, a stone floor tile, a quartz floor tile, a cement floor tile, and a concrete floor tile. As stated above, preferably the second layer(s) can be applied to a side (i.e., surface) of the non-recycled layer(s) of the multilayer foam structure.

In these laminates, the first layer may be joined to the adjacent panel or tile by means of chemical bonds, mechanical means, or a combination thereof. The adjacent laminate layers may also be affixed to each other by any other means including the use of attractive forces between materials having opposite electromagnetic charges or attractive forces present between materials which both have either a predominantly hydrophobic character or a predominantly hydrophilic character.

A popular method of attaching the disclosed multilayer foam to a floor panel—particularly a solid hardwood floor panel, an engineered wood floor panel, and a laminate floor panel—can be via a pressure sensitive adhesive layer that can be disposed on at least a portion of the foam surface and/or panel surface. Preferably, the adhesive layer can be disposed on the surface of a non-recycled layer of the multilayer foam structure. Any pressure sensitive adhesive known in the art may be used. Examples of such pressure sensitive adhesives are acrylic polymers, polyurethanes, thermoplastic elastomers, block copolymers, polyolefins, silicones, rubber based adhesives, copolymers of ethylhexylacrylate and acrylic acid, copolymers of isooctyl acrylate and acrylic acid, blends of acrylic adhesives and rubber based adhesives as well as combinations of the foregoing.

The multilayer foam attached to the floor panel—particularly a solid hardwood floor panel, an engineered wood floor panel, and a laminate floor panel—serves several purposes. The foam can reduce the reflected sound pressure level when the panel is impacted, for example, when walking on the panel with boots or high heeled shoes. The foam can also act as a moisture vapor barrier between the panel and sub-floor and can help provide a more uniform laydown among multiple panels since any unevenness, bumps, or spikes (for example a protruding nailhead) on the sub-floor will be buffered by the foam. These floor panels and tiles are commonly installed in residential homes, office buildings, and other commercial buildings.

Another embodiment of the present invention provides a flooring system including: a top floor layer; a sub-floor layer; and one or more underlayment layers where at least one of the underlayment layers contains the disclosed multilayer foam structure disposed between the sub-floor and the top floor layer. Preferably, the sub-floor and the top floor layers can be applied to sides/surfaces of non-recycled layers of the multilayer foam structure.

In this system, the foam layer may or may not be joined to any adjacent layer, including the sub-floor or the top floor layer. When any layer in the disclosed system is joined, the attachment can be performed by means of chemical bonds, mechanical means, or combinations thereof. The adjacent layers may also be affixed to each other by any other means including the use of attractive forces between materials having opposite electromagnetic charges or attractive forces present between materials which both have either a predominantly hydrophobic character or a predominantly hydrophilic character.

If any layers are attached, a popular method of attachment can be the use of either a one component urethane adhesive, a two component urethane adhesive, a one component acrylic adhesive, or a two component acrylic adhesive. The adhesive can be applied during the installation of the system in residential homes, office buildings, and commercial buildings.

The foam in this system serves several purposes. The foam can reduce the reflected sound pressure level when the top floor layer is impacted, for example, when walking on the panel with boots or high heeled shoes. The foam can also act as a moisture vapor barrier between the panel and sub-floor and help provide a more uniform laydown among multiple panels since any unevenness, bumps, or spikes (for example a protruding nailhead) on the sub-floor will be buffered by the foam. For cases where the top floor layer is composed of ceramic floor tiles, porcelain floor tiles, stone floor tiles, quartz floor tiles, cement floor tiles, and concrete floor tiles connected by grout and where all layers in the flooring system are joined, the foam can help reduce grout fracturing by buffering varying thermal expansions and contractions of the various layers in the system.

To satisfy the requirements of any of the above applications, the disclosed structures of the present disclosure may be subjected to various secondary processes, including and not limited to, embossing, corona or plasma treatment, surface roughening, surface smoothing, perforation or microperforation, splicing, slicing, skiving, layering, bonding, and hole punching.

EXAMPLES

The following Table provides a list of various components and descriptions of those components used in the following Examples.

TABLE 1

| Component | Description |
|---|---|
| 7250FL | polypropylene/polyethylene random copolymer commercially produced by Total Petrochemicals [MFI is about 1.3-1.6 (2.16 kg, 230° C.)] |
| 6232 | polypropylene/polyethylene random copolymer commercially produced by Total Petrochemicals [MFI is about 1.7-2.3 (2.16 kg, 230° C.)] |
| Infuse ™ OBC 9107 | polyethylene/octene metallocene block copolymer (with a controlled block sequence) commercially produced by Dow [MFI is about 0.75-1.25 (2.16 kg, 190° C.)] |
| Adflex ™ Q100F | reactor produced thermoplastic polyolefin (rTPO) commercially produced by LyondellBasell [MFI is about 0.5-0.7 (2.16 kg, 230° C.)] |
| LLP8501.67 | linear low density polyethylene (LLDPE)/hexane copolymer commercially produced by ExxonMobil [MFI is about 5.9-7.5 (2.16 kg, 190° C.)] |
| ADCA | TC-18I azodicarbonamide commercially produced by P.T. Lauten Otsuka Chemical |
| DVB | DVB HP (80% DVB) commercially produced by Dow |
| PR023 | a Toray Plastics (America), Inc. standard compounded antioxidant package for polyolefin foam consisting of 14% antioxidants, 0.35% calcium stearate, and 85.65% low density polyethylene (LDPE) carrier resin |
| TPM11166 | an extrusion processing aid blend compounded in an LDPE carrier resin commercially produced by Techmer PM |
| recycled resin | Factory scrap metalized homopolymer polypropylene (hPP) based film metalized with about 0.02-0.05 μm of physical vapor deposited aluminum that was shredded and recycled into extrudable oval pellets |
| recycled crosslinked foam | cryogenically pulverized factory scrap crosslinked polypropylene/polyethylene blended foam (PP-PE-X-E): The size distribution of the pulverized foam particles were measured using a Ro-Tap ® sieve shaker with U.S. Standard Sieves constructed according to ASTM E11. The particle size distribution was measured as: 20 U.S. Standard Sieve: 0.0% 30 U.S. Standard Sieve: 2.5% 40 U.S. Standard Sieve: 26.7% 60 U.S. Standard Sieve: 31.6% 80 U.S. Standard Sieve: 14.4% 100 U.S. Standard Sieve: 6.6% Pan: 18.2% |

(All examples in this disclosure were coextruded using feed block manifolds)

Example 1—AB Article Where A=Foam & B=Film

Components A (i.e., foam layer components) including resins (50 wt. % Infuse™ OBC 9107, 40 wt. % 6232, and 10 wt. % Adflex™ Q100F), chemical foaming agent (7.5% PPHR ADCA), crosslinking promoter (2.5% PPHR DVB), antioxidants (5.5% PPHR PR023), and processing aid (2.0% PPHR TPM11166) were fed into a first extruder. The first extruder extruded the Components A at a specific energy of 12.1 kW·hr/kg and a temperature of 173° C. Components B (i.e., film layer components) including resins (100 wt. % Adflex™ Q100F), antioxidants (2.75% PPHR PR023), and processing aid (2.0% PPHR TPM11166) were fed into a second extruder. As the first extruder extruded Components A, the second extruder simultaneously extruded Components B at a specific energy of 39.2 kW·hr/kg and a temperature of 201° C.

Figure 1B:
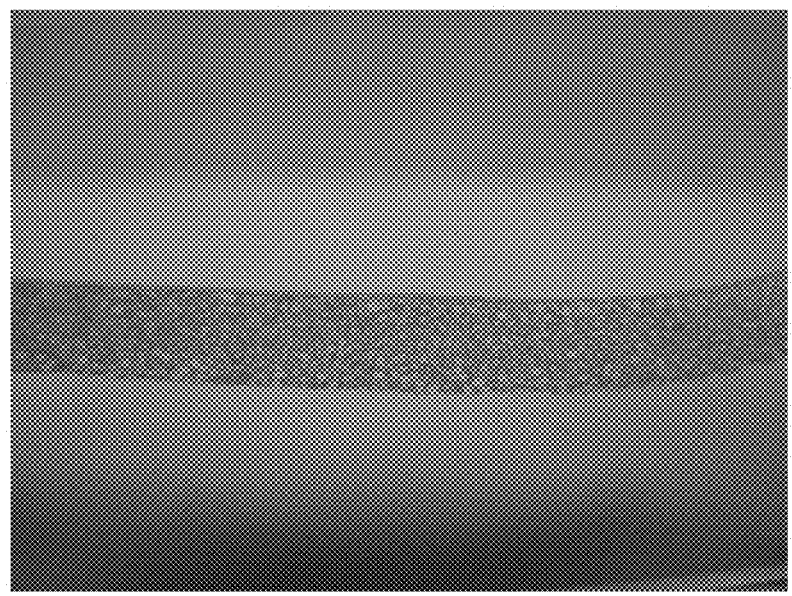
FIG. 1B is a frontlit non-magnified photo of the foam of Example 1.
Figure 1C:
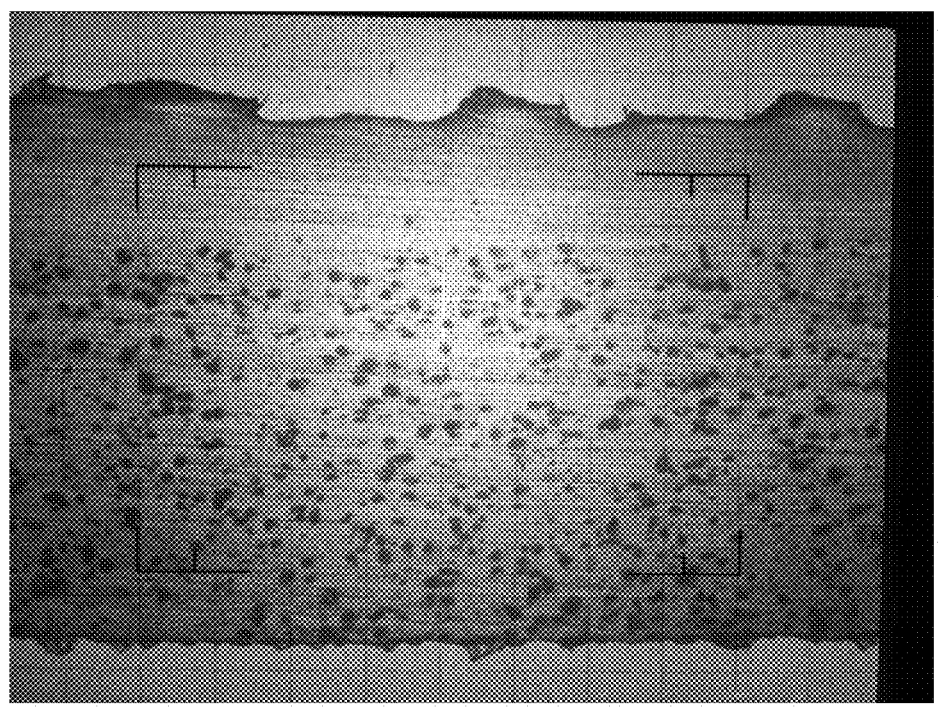
FIG. 1C is a backlit magnified photograph of the unfoamed Example 1.

Components A and Components B were coextruded using an 80/20 feed block manifold to produce an uncrosslinked, unfoamed multilayer sheet of about 1.33 mm thickness (the unfoamed A layer is about 0.97 mm thick and the unfoamed B layer is about 0.36 mm thick). FIG. 1C is a backlit magnified photograph of a thin slice of the unfoamed multilayer sheet. After co-extrusion, the sheet was crosslinked by electron beam radiation at a dosage of 45 kGy with Components B layer (i.e., the film layer) facing the radiation source. In addition, the radiation voltage (650 kv) was selected such that the exposure was fairly uniform throughout the depth of the sheet.

After crosslinking, the sheet was heated on both surfaces to about 450° F. to obtain a multilayer foam structure of 3.98 mm average thickness and 0.102 g/cm³ average overall density. The foam layer was about 3.88 mm thick and the film layer was about 0.10 mm thick. In addition, the overall average gel fraction percentage (crosslinking percentage) of the multilayer foam structure was 45.7%. FIG. 1A is a backlit magnified photograph of the Example 1 foam that's been thinly sliced. FIG. 1B is a frontlit non-magnified photograph of the Example 1 foam that's been thinly sliced. The skin layer is visible in both FIGS. 1A-1B.

Example 2—A/B Article Where A=Foam & B=Foam

Components A (i.e., 1$^{st}$ foam layer components) including resins (50 wt. % Infuse™ OBC 9107, 40 wt. % 6232, and 10 wt. % Adflex™ Q100F), chemical foaming agent (7.5% PPHR ADCA), crosslinking promoter (2.5% PPHR DVB), antioxidants (5.5% PPHR PR023), and processing aid (2.0% PPHR TPM11166) were fed into a first extruder. The first extruder extruded the Components A at a specific energy of 11.5 kW·hr/kg and a temperature of 173° C. Components B (i.e., 2$^{nd}$ foam layer components) including resins (40 wt. % 7250FL, 32.5 wt. % 6232, 15 wt. % Adflex™ Q100F, 12.5 wt. % LLP8501.67), chemical foaming agent (7.5% PPHR ADCA), crosslinking promoter (2.75% PPHR DVB), antioxidants (5.0% PPHR PR023), and processing aid (2.0% PPHR TPM11166) were fed into a second extruder. As the first extruder extruded Components A, the second extruder simultaneously extruded Components B at a specific energy of 15.5 kW·hr/kg and a temperature of 168° C.

Figure 2A:
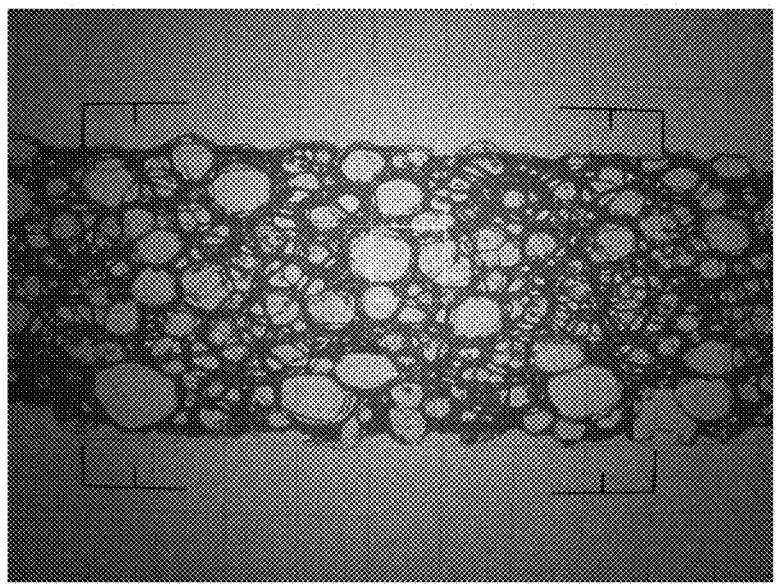
FIG. 2A is a backlit magnified photograph of the foam of Example 2.
Figure 2B:
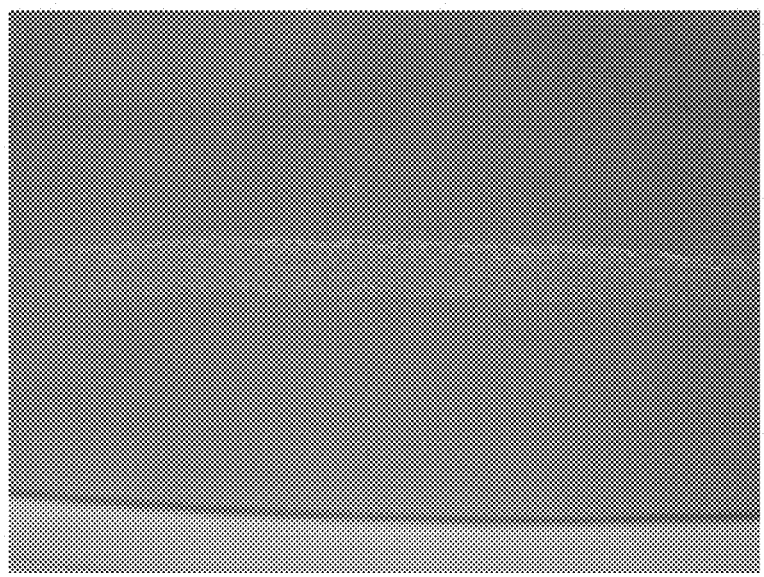
FIG. 2B is a frontlit non-magnified photo of the foam of Example 2.
Figure 2C:
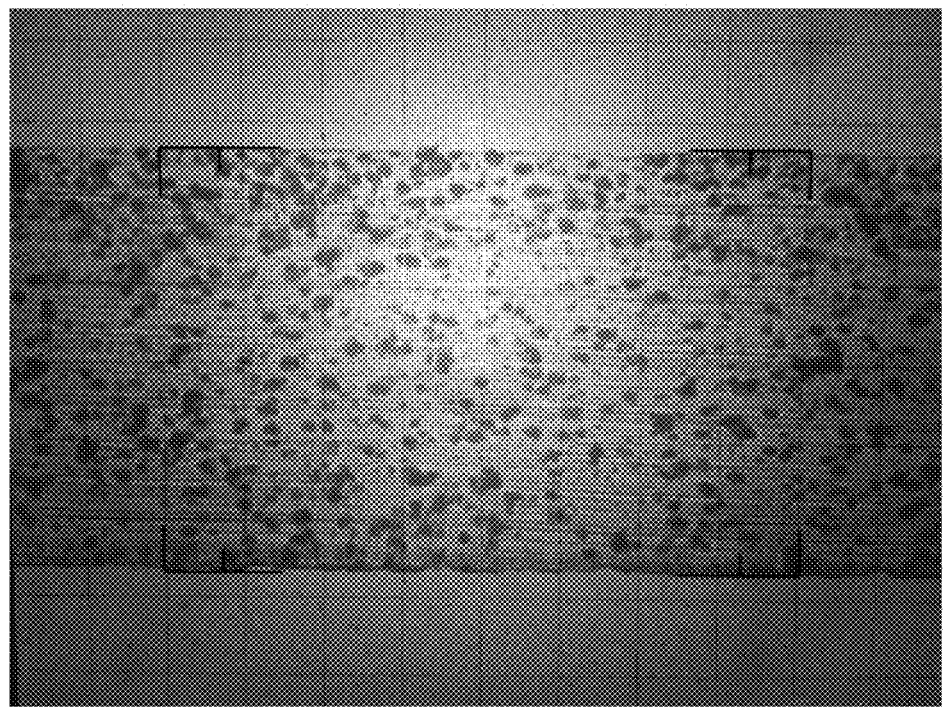
FIG. 2C is a backlit magnified photograph of the unfoamed Example 2.

Components A and Components B were coextruded using an 80/20 feed block manifold to produce an uncrosslinked, unfoamed multilayer sheet of about 1.05 mm thickness (the unfoamed A layer is about 0.80 mm thick and the unfoamed B layer is about 0.25 mm thick). FIG. 2C is a backlit magnified photograph of a thin slice of the unfoamed multilayer sheet. After co-extrusion, the sheet was crosslinked by electron beam radiation at a dosage of 45 kGy with Components B layer (i.e., the 2$^{nd}$ foam layer) facing the radiation source. In addition, the radiation voltage (650 kv)

was selected such that the exposure was fairly uniform throughout the depth of the sheet.

After crosslinking, the sheet was heated on both surfaces to about 450° F. to obtain a multilayer foam structure of 2.24 mm average thickness and 0.133 g/cm$^3$ average overall density. The 1$^{st}$ foam layer was about 1.61 mm thick and the 2$^{nd}$ foam layer was about 0.63 mm thick. In addition, the overall average gel fraction percentage (crosslinking percentage) of the multilayer foam structure was 46.7%. FIG. 2A is a backlit magnified photograph of Example 2 foam that's been thinly sliced. FIG. 2B is a frontlit non-magnified photograph of Example 2 foam that's been thinly sliced.

Example 3—A/B/A Article Where A=Foam & B=Foam Including Recycled Metallized Polyolefin Material Components A (i.e., 1$^{st}$ and 3$^{rd}$ foam layer components) including resins (40 wt. % 7250FL, 32.5 wt. % 6232, 15 wt. % Adflex™ Q100F, 12.5 wt. % LLP8501.67), chemical foaming agent (7.5% PPHR ADCA), crosslinking promoter (2.75% PPHR DVB), antioxidants (5.0% PPHR PR023), and processing aid (2.0% PPHR TPM11166) were fed into a first and third extruder. The first and third extruders extruded the Components A at a specific energy of 18.3 kW·hr/kg and a temperature of 172° C. Components B (i.e., 2$^{nd}$ recycled foam layer components) including resins (40 wt. % 7250FL, 32.5 wt. % 6232, 15 wt. % recycled resin, 12.5 wt. % LLP8501.67), chemical foaming agent (7.5% PPHR ADCA), crosslinking promoter (2.75% PPHR DVB), antioxidants (5.0% PPHR PR023), and processing aid (2.0% PPHR TPM11166) were fed into a second extruder. As the first and third extruders extruded Components A, the second extruder simultaneously extruded Components B at a specific energy of 16.4 kW·hr/kg and a temperature of 169° C.

Figure 3A:
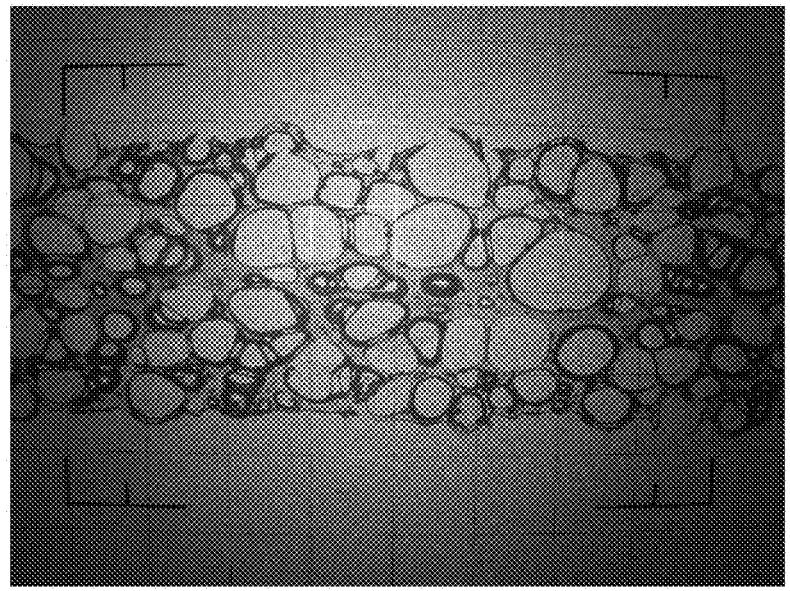
FIG. 3A is a first backlit magnified photograph of the foam of Example 3.
Figure 3B:
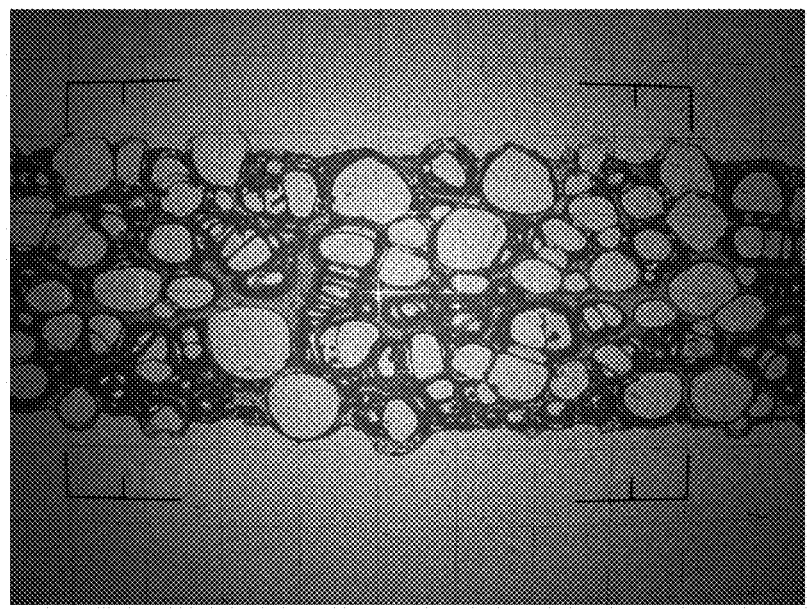
FIG. 3B is a second backlit magnified photograph of the foam of Example 3.
Figure 3C:
FIG. 3C is a first frontlit non-magnified photo of the foam of Example 3.
Figure 3D:
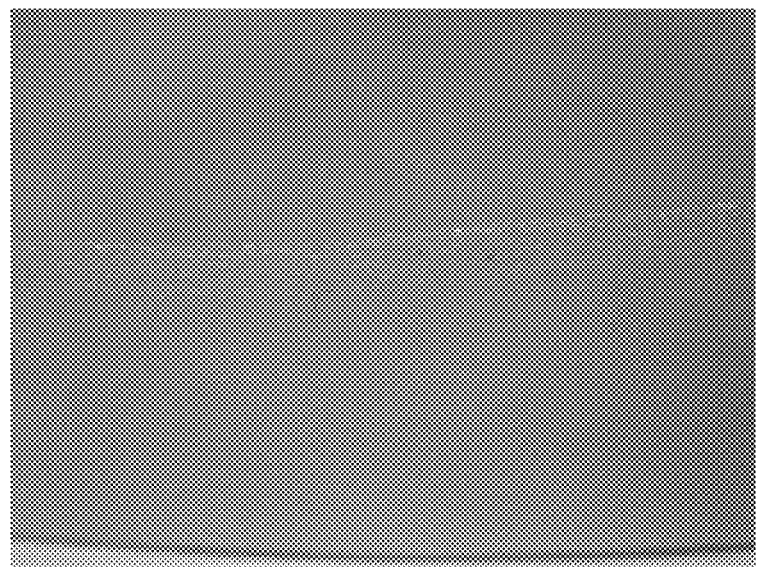
FIG. 3D is a second frontlit non-magnified photo of the foam of Example 3.
Figure 3E:
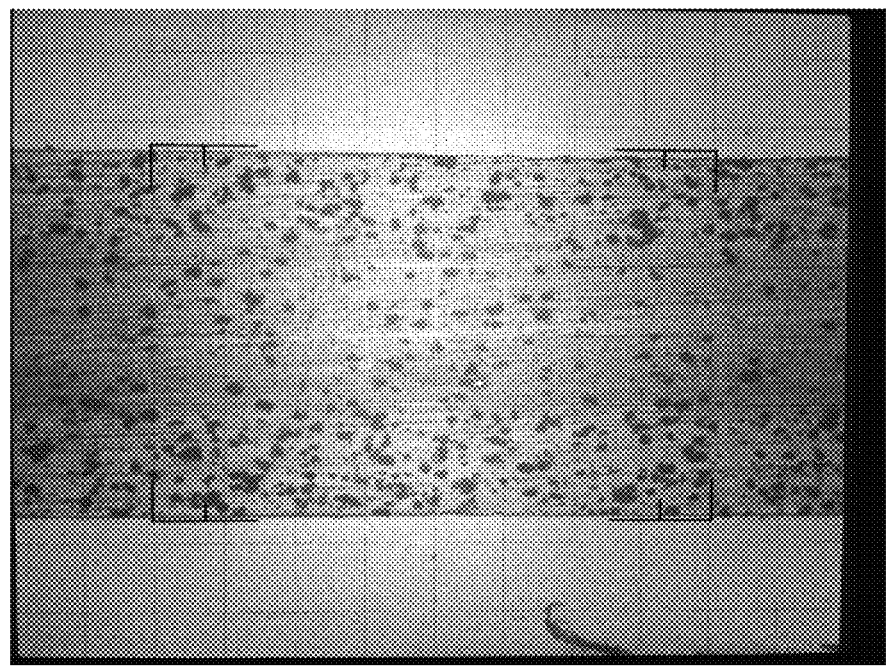
FIG. 3E is a backlit magnified photograph of the unfoamed Example 3.

Components A and Components B were coextruded using an 25/50/25 feed block manifold to produce an uncrosslinked, unfoamed multilayer sheet of about 1.04 mm thickness (the unfoamed A layers are about 0.26 and 0.28 mm thick and the unfoamed B layer is about 0.50 mm thick). FIG. 3E is a backlit magnified photograph of a thin slice of the unfoamed multilayer sheet. After co-extrusion, the sheet was crosslinked by electron beam radiation at a dosage of 45 kGy. In addition, the radiation voltage (650 kv) was selected such that the exposure was fairly uniform throughout the depth of the sheet.

After crosslinking, the sheet was heated on both surfaces to about 450° F. to obtain a multilayer foam structure of 2.05 mm average thickness and 0.208 g/cm$^3$ average overall density, wherein the 1$^{st}$ and 3$^{rd}$ foam layers sandwich the 2$^{nd}$ recycled foam layer. The 1$^{st}$ and 3$^{rd}$ foam layers combined were about 1.06 mm thick (each about 0.53 mm) and the 2$^{nd}$ recycled foam layer was about 0.99 mm thick. In addition, the overall average gel fraction percentage (crosslinking percentage) of the multilayer foam structure was 43.2%. FIGS. 3A-3B are backlit magnified photographs of the Example 3 foam that's been thinly sliced. FIGS. 3C-3D are frontlit non-magnifed photographs of the Example 3 foam that's been thinly sliced.

Example 4—A/B/A Article Where A=Foam & B=Foam Including Recycled Cryogenically Pulverized Foam Material Components A (i.e., 1$^{st}$ and 3$^{rd}$ foam layer components) including resins (40 wt. % 7250FL, 32.5 wt. % 6232, 15 wt. % Adflex™ Q100F, 12.5 wt. % LLP8501.67), chemical foaming agent (7.5% PPHR ADCA), crosslinking promoter (2.75% PPHR DVB), antioxidants (5.0% PPHR PR023), and processing aid (2.0% PPHR TPM11166) were fed into a first and third extruder. The first and third extruders extruded the Components A at a specific energy of 18.3 kW·hr/kg and a temperature of 172° C. Components B (i.e., 2$^{nd}$ recycled foam layer components) including resins (40 wt. % 7250FL, 32.5 wt. % 6232, 15 wt. % recycled crosslinked foam, 12.5 wt. % LLP8501.67), chemical foaming agent (7.5% PPHR ADCA), crosslinking promoter (2.75% PPHR DVB), antioxidants (5.0% PPHR PR023), and processing aid (2.0% PPHR TPM11166) were fed into a second extruder. As the first and third extruders extruded Components A, the second extruder simultaneously extruded Components B at a specific energy of 17 kW·hr/kg and a temperature of 170° C.

Figure 4A:
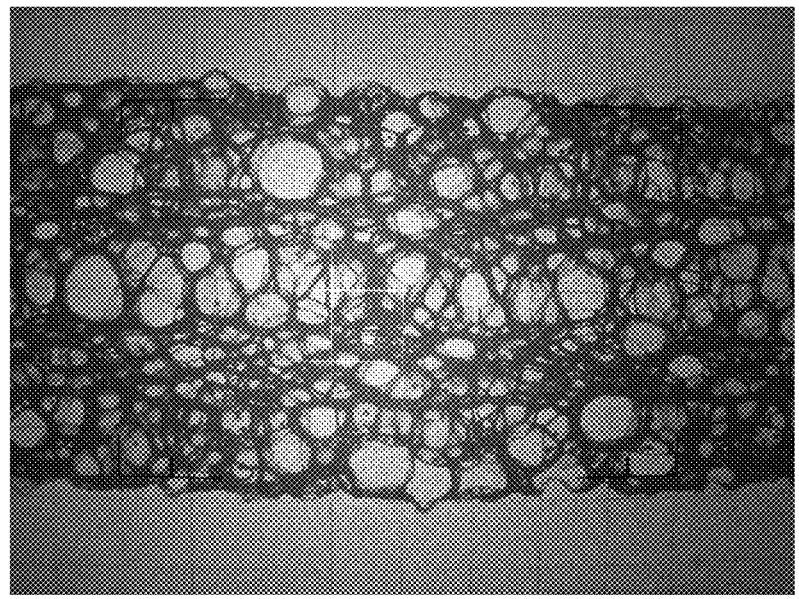
FIG. 4A is a backlit magnified photograph of the foam of Example 4.
Figure 4B:
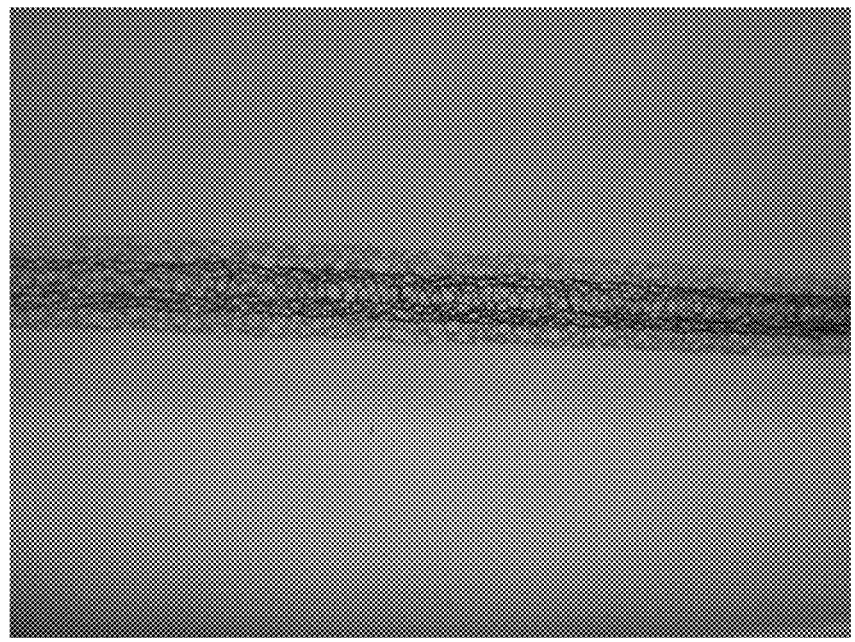
FIG. 4B is a frontlit non-magnified photo of the foam of Example 4.
Figure 4C:
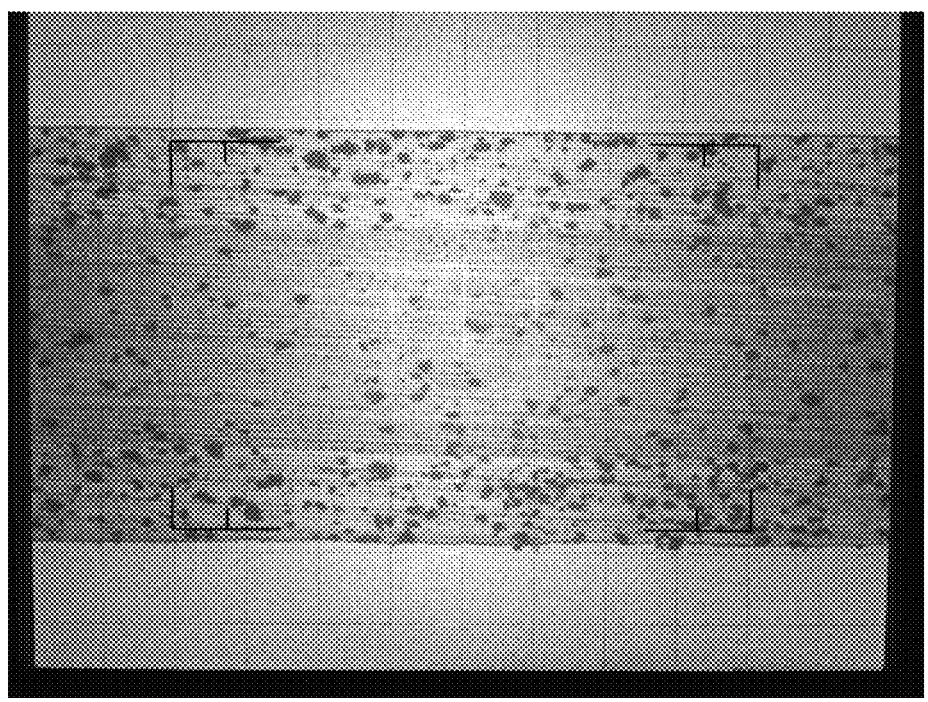
FIG. 4C is a backlit magnified photograph of the unfoamed Example 4.
Figure 5A:
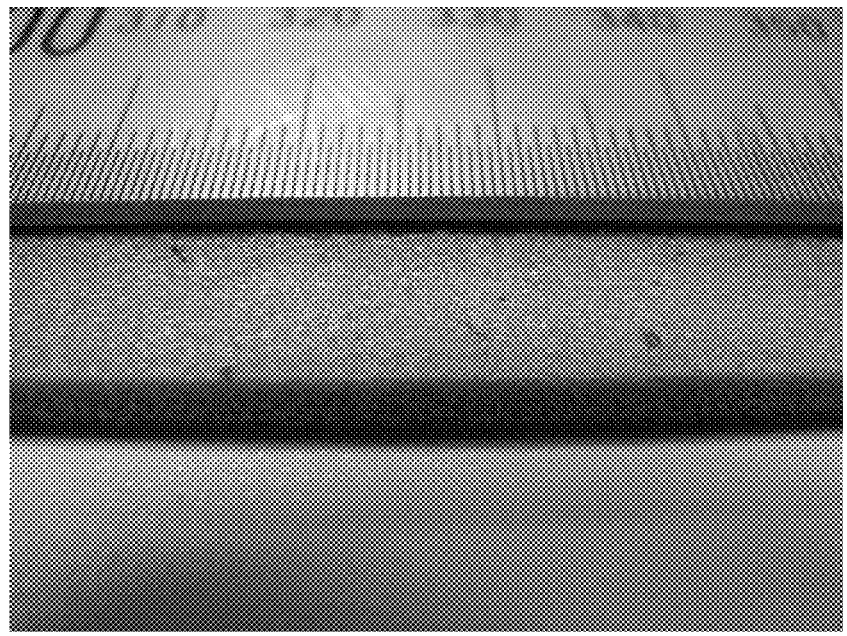
FIG. 5A is a first photo of a foam containing shredded recycled, crosslinked polyolefin foam.
Figure 5B:
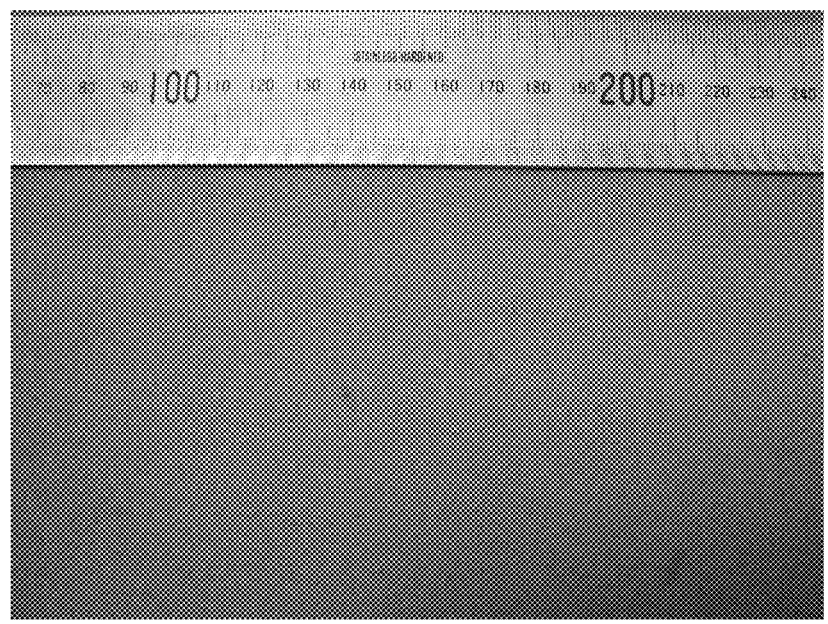
FIG. 5B is a second photo of a foam containing shredded recycled, crosslinked polyolefin foam.

Components A and Components B were coextruded using an 25/50/25 feed block manifold to produce an uncrosslinked, unfoamed multilayer sheet of about 1.11 mm thickness (the unfoamed A layers are about 0.26 and 0.25 mm thick and the unfoamed B layer is about 0.60 mm thick). FIG. 4C is a backlit magnified photograph of a thin slice of the unfoamed multilayer sheet. After co-extrusion, the sheet was crosslinked by electron beam radiation at a dosage of 45 kGy. In addition, the radiation voltage (650 kv) was selected such that the exposure was fairly uniform throughout the depth of the sheet.

After crosslinking, the sheet was heated on both surfaces to about 450° F. to obtain a multilayer foam structure of 3.60 mm average thickness and 0.130 g/cm$^3$ average overall density, wherein the 1$^{st}$ and 3$^{rd}$ foam layers sandwich the 2$^{nd}$ recycled foam layer. The 1$^{st}$ and 3$^{rd}$ foam layers combined were about 1.90 mm thick (each about 0.95 mm) and the 2$^{nd}$ recycled foam layer was about 1.70 mm thick. In addition, the overall average gel fraction percentage (crosslinking percentage) of the multilayer foam structure was 37.9%. FIG. 4A is a backlit magnified photograph of the Example 4 foam. FIG. 4B is a frontlit non-magnified photograph of the Example 4 foam. Note that in Example 4, the recycled, crosslinked foam material was a charcoal color and this is the reason why the middle layer is darker.

Extrusion Foaming Vs. Extruding then Foaming

A polyethylene extrusion foamed sheet (a 0.025-0.026 g/cm$^3$ pool liner wall foam commercially available from the Gladon Company (Oak Creek, Wis.) ("38064 blue Gladon")) was compared to two 0.025-0.026 g/cm$^3$ polyethylene foam sheets produced by the methods disclosed herein. The first sheet is Toraypef® 40100-AG00 commercially produced by Toray Industries, Inc (Shiga, JP). The 40100-AG00 was foamed by heating the radiation crosslinked sheet with hot air. The second sheet is Toraypef® 40064LCE-STD produced by Toray Plastics (America), Inc. The 40064LCE-STD was foamed by heating the radiation crosslinked sheet by molten salt on one surface and radiant heat on the other surface. The surface characteristics of these three Examples were tested using a Nanovea ST400 3D Profilometer. The probe specifications and measurement parameters can be found in Tables 2 and 3 below. As shown in Table 4 below, regardless of the heating method, the extrusion foamed material (38064 blue Gladon) is significantly rougher (exhibiting a mean surface roughness (Sa) of 83.9 μm and a maximum height (height between the highest peak and the deepest valley) (Sz) of 706 μm) than the extruded then foamed sheets (40100-AG00 & 40064LCE-STD) (exhibiting a mean surface roughness (Sa) between 20.7-65.2 μm and a maximum height (Sz) of 237-592 μm).

Chemically Crosslinked Vs. Physically Crosslinked

The surface of a 0.067 g/cm³ chemically crosslinked polyolefin foam sheet (ProGame™ XC-Cut 7010 commercially produced by Trocellen Group of Companies) was compared to two 0.067 g/cm³ physically crosslinked polypropylene/polyethylene blended foam sheets (Toraypef® 15030AC17-STD & ToraSoft® 15030SR18-STD) produced by the methods disclosed herein. Both the chemically crosslinked foam and the physically crosslinked foams were foamed in a post-extrusion process. The surface characteristics of these three Examples were tested using a Nanovea ST400 3D Profilometer. The probe specifications and measurement parameters can be found in Tables 2 and 3 below. As shown in Table 4 below, the chemically crosslinked foam (XC-Cut 7010) exhibited a mean surface roughness (Sa) of 89.5 µm and a maximum height (Sz) of 856 µm. The physically crosslinked foams exhibited a mean surface roughness (Sa) of 7.63-23.9 µm and a maximum height (Sz) of 81.0-273 µm. Thus, the physically crosslinked foams exhibit significantly smoother surfaces versus the chemically crosslinked foam.

TABLE 2

| Measurement Range | P1-OP400C | P1-OP1200C |
| --- | --- | --- |
| Z Resolution (nm) | 12 | 25 |
| Z Accuracy (nm) | 60 | 200 |
| Lateral Resolution (µm) | 3.5 | 4.0 |

TABLE 3

| | 400100-AG00, 40064 LCE-STD, 15030AC17-STD, 15030SR18-STD | 40064 LCE-STD unlabeled side, 38064, XC-Cut 7010 |
| --- | --- | --- |
| Probe | P1-OP400C | P1-OP1200C |
| Acquisition rate | 800-1850 Hz | 200-1500 Hz |
| Averaging | 1 | 1 |
| Measured surface | 10 mm × 10 mm | 10 mm × 10 mm |
| Step size | 10 µm × 15 µm | 10 µm × 15 µm |
| Measurement Time | 00:49:23 | 01:31:45 |

TABLE 4

| Sample | Sa (µm) | Sz (µm) |
| --- | --- | --- |
| 400100-AG00 labeled side | 20.7 | 237 |
| 400100-AG00 unlabeled side | 29.5 | 276 |
| 40064 LCE-STD labeled side | 22.8 | 281 |
| 40064 LCE-STD unlabeled side | 65.2 | 592 |
| 38064 blue Gladon | 83.9 | 706 |
| 15030AC17-STD labeled side | 22.7 | 273 |
| 15030AC17-STD unlabeled side | 7.63 | 81.0 |
| 15030SR18-STD labeled side | 23.9 | 261 |
| 15030SR18-STD unlabeled side | 12.7 | 149 |
| XC-Cut 7010 "15100" | 89.5 | 856 |

Test Methods

The various properties in the above examples were measured by the following methods:

The specific energy of an extruder can be calculated according to the formula:

$$\text{Specific Energy} = \frac{KW(\text{applied})}{\text{feedrate}\left(\frac{kg}{hr}\right)}, \text{ where}$$

$$KW(\text{applied}) = \frac{KW(\text{motor rating}) * (\% \text{ torque from maximum allowable}) * RPM(\text{actual running } RPM)}{\text{Max } RPM(\text{capability of extruder}) * 0.97 \text{ (gearbox efficiency)}}$$

In general, preferred values of specific energy would be at least 0.090 kW·hr/kg, preferably at least 0.105 kW·hr/kg, and more preferably at least 0.120 kW·hr/kg, and even more preferably at least 10 kW·hr/kg.

The "density" of the multilayer foam structure can be defined and measured using section or "overall" density, rather than a "core" density, according to JIS K6767. In general, preferred values of density would be 20-250 kg/m³, and more preferably 30-125 kg/m³.

The "mean surface roughness" and "maximum height" (height between the highest peak and the deepest valley) of the multilayer foam structure's surface can be defined and measured using a Nanovea 3D Non-Contact Profilometer. The probe specifications and measurement parameters for measuring the mean surface roughness and maximum height can be found in Tables 2 and 3. The mean surface roughness for the foams produced can be less than about 80 µm, less than about 70 µm, less than about 50 µm, less than about 40 µm, less than about 30 µm, less than about 25 µm, less than about 20 µm, less than about 15 µm, and less than about 10 µm. The maximum height for the surface of foams produced can be less than about 700 µm, less than about 600 µm, less than about 300 µm, less than about 250 µm, less than about 200 µm, less than about 150 µm, and less than 100 µm.

"Crosslinking" can be measured according to the "Toray Gel Fraction Method," where tetralin solvent is used to dissolve non-crosslinked components. In principle, non-crosslinked material is dissolved in tetralin and the crosslinking degree is expressed as the weight percentage of crosslinked material. The apparatus used to determine the percent of polymer crosslinking includes: 100 mesh (0.0045 inch wire diameter); Type 304 stainless steel bags; numbered wires and clips; a Miyamoto thermostatic oil bath apparatus; an analytical balance; a fume hood; a gas burner; a high temperature oven; an anti-static gun; and three 3.5 liter wide mouth stainless steel containers with lids. Reagents and materials used include tetralin high molecular weight solvent, acetone, and silicone oil. Specifically, an empty wire mesh bag is weighed and the weight recorded. For each sample, about 100 milligrams±about 5 milligrams of sample is weighed out and transferred to the wire mesh bag. The weight of the wire mesh bag and the sample, typically in the form of foam cuttings, is recorded. Each bag is attached to the corresponding number wire and clips. When the solvent temperature reaches 130° C., the bundle (bag and sample) is immersed in the solvent. The samples are shaken up and down about 5 or 6 times to loosen any air bubbles and fully wet the samples. The samples are attached to an agitator and agitated for three (3) hours so that the solvent can dissolve the foam. The samples are then cooled in a fume hood. The samples are washed by shaking up and down about 7 or 8 times in a container of primary acetone. The samples are washed a second time in a second acetone wash. The washed samples are washed once more in a third container of fresh acetone as above. The samples are then hung in a fume hood to evaporate the acetone for about 1 to about 5 minutes. The samples are then dried in a drying oven for about 1 hour at 120° C. The samples are cooled for a minimum of about 15 minutes. The wire mesh bag is weighed on an analytical balance and the weight is recorded. Crosslinking is then calculated using the formula 100*(C−A)/(B−A), where A=empty wire mesh bag weight; B=wire bag weight+foam sample before immersion in tetralin; and C=wire bag weight+dissolved sample after immersion in tetralin. In general, preferred values of crosslinking degree can be 20-75%, and more preferably 30-60%.

The "melt flow index" (MFI) value for a polymer can be defined and measured according to ASTM D1238 at 230° C. for polypropylenes and polypropylene based materials and at 190° C. for polyethylenes and polyethylene based materials using a 2.16 kg plunger for 10 minutes. The test time may be reduced for relatively high melt flow resins.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed as new and desired to be protected by Letters Patent of the United States is:

1. A method of forming a multilayer structure comprising:
    coextruding:
        a first layer comprising:
            polypropylene or polyethylene; and
            a first chemical foaming agent; and
        a second layer on a side of the first layer, the second layer comprising:
            5-50 wt. % recycled, crosslinked polyolefin foam material comprising cryogenically pulverized polyolefin foam material;
            50-95 wt. % polypropylene, polyethylene, or a combination of polypropylene and polyethylene; and
            a second chemical foaming agent.

2. The method of claim 1, further comprising coextruding a third layer on a side of the second layer opposite the first layer, the third layer comprising:
    polypropylene or polyethylene; and
    a third chemical foaming agent.

3. The method of claim 2, wherein the first layer and the third layer are substantially free of recycled polyolefin material.

4. The method of claim 1, wherein the cryogenically pulverized polyolefin foam material is small enough to pass through a 3.5 U.S. Standard mesh.

5. The method of claim 1, wherein the first layer comprises polypropylene with a melt flow index of 0.1-25 grams per 10 minutes at 230° C.

6. The method of claim 1, wherein the first layer comprises polyethylene with a melt flow index of 0.1-25 grams per 10 minutes at 190° C.

7. The method of claim 2, wherein the first, second, and third layers comprise a crosslinking agent.

8. The method of claim 2, wherein the first, second, and third chemical foaming agent is azodicarbonamide.

9. The method of claim 2, wherein the first layer and third layer comprise polypropylene and polyethylene.

10. A method of forming a multilayer foam structure comprising:
    coextruding:
        a first layer comprising:
            polypropylene or polyethylene; and
            a first chemical foaming agent; and
        a second layer on a side of the first layer, the second layer comprising:
            5-50 wt. % recycled, crosslinked polyolefin foam material;
            50-95 wt. % polypropylene, polyethylene, or a combination of polypropylene and polyethylene; and
            a second chemical foaming agent;
    irradiating the coextruded layers with ionizing radiation; and
    foaming the irradiated, coextruded layers.

11. The method of claim 10, further comprising coextruding a third layer on a side of the second layer opposite the first layer, the third layer comprising:
    polypropylene or polyethylene; and
    a third chemical foaming agent.

12. The method of claim 11, wherein the first layer and the third layer are substantially free of recycled polyolefin material.

13. The method of claim 10, wherein the recycled, crosslinked polyolefin foam material comprises cryogenically pulverized polyolefin foam material.

14. The method of claim 10, wherein the ionizing radiation is selected from the group consisting of alpha rays, beta rays, gamma rays, or electron beams.

15. The method of claim 10, wherein the coextruded layers are irradiated up to 4 separate times.

16. The method of claim 14, wherein the ionizing radiation is an electron beam with an acceleration voltage of 200-1500 kV.

17. The method of claim 16, wherein an absorbed electron beam dosage is 10-500 kGy.

18. The method of claim 10, wherein the ionizing radiation crosslinks the extruded structure to a crosslinking degree of 20-75%.

19. The method of claim 10, wherein foaming comprises heating the irradiated coextruded layers with molten salt.

20. The method of claim 10, wherein the multilayer foam structure has a density of 20-250 kg/m$^3$.

21. The method of claim 10, wherein the multilayer foam structure has an average closed cell size of 0.05-1.0 mm.

22. The method of claim 10, wherein the multilayer foam structure has a thickness of 0.2-50 mm.

23. The method of claim 10, wherein a mean surface roughness for the first layer is less than 80 μm.

24. The method of claim 11, wherein the first layer and third layer comprise polypropylene and polyethylene.

* * * * *